(12) United States Patent
Zheng et al.

(10) Patent No.: US 9,094,200 B2
(45) Date of Patent: Jul. 28, 2015

(54) METHOD, APPARATUS AND SYSTEM FOR SENDING AND RECEIVING A MEDIA STREAM

(71) Applicant: Huawei Technologies Co., Ltd., Shenzhen, Guangdong (CN)

(72) Inventors: Hewen Zheng, Nanjing (CN); Xingfen Wu, Nanjing (CN); Jian Cheng, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 335 days.

(21) Appl. No.: 13/759,527

(22) Filed: Feb. 5, 2013

(65) Prior Publication Data

US 2013/0166982 A1   Jun. 27, 2013

Related U.S. Application Data

(63) Continuation of application No. PCT/CN2011/075171, filed on Jun. 2, 2011.

(30) Foreign Application Priority Data

Sep. 10, 2010 (CN) .......................... 2010 1 0280868

(51) Int. Cl.
*H04L 1/18* (2006.01)

(52) U.S. Cl.
CPC ................ *H04L 1/18* (2013.01); *H04L 1/1877* (2013.01); *H04L 1/1896* (2013.01)

(58) Field of Classification Search
CPC .... H04L 1/1809; H04L 1/1812; H04L 1/1819
See application file for complete search history.

(56) References Cited

U.S. PATENT DOCUMENTS 7,522,528 B2 * 4/2009 Fellman et al. ............... 370/236
7,562,277 B2 * 7/2009 Park et al. ..................... 714/748
(Continued)

FOREIGN PATENT DOCUMENTS

CN          1476267 A       2/2004
CN        101150453 A       3/2008
(Continued)

OTHER PUBLICATIONS

Wu, Q. "HTTP Streaming Optimization Problem Statement," Internet Draft, Jul. 5, 2010, Internet Engineering Task Force, Fremont, California.

(Continued)

*Primary Examiner* — Esaw Abraham
(74) *Attorney, Agent, or Firm* — Leydig, Voit & Mayer, Ltd.

(57) ABSTRACT

Embodiments of the present invention provide a method, an apparatus and a system for sending and receiving a media stream. In the embodiments of the present invention, during a transmission process of media content, if the packet loss occurs, and if retransmission still does not succeed after the retransmission has been attempted for finite times, the retransmission of the lost data packet is abandoned through notification of the retransmission suppression information, and transmission of a subsequent part of media stream is continued, which ensures uninterrupted transmission of the media stream, and avoids the occurrence of a screen mess of a picture, a picture jitter or pause, and even a program interrupt, thereby improving picture quality.

7 Claims, 18 Drawing Sheets

(56) References Cited

U.S. PATENT DOCUMENTS

| | | | |
|---|---|---|---|
| 7,586,952 B2* | 9/2009 | Inazumi | 370/474 |
| 7,710,921 B2* | 5/2010 | Matsumoto | 370/331 |
| 7,738,459 B2* | 6/2010 | Sittin et al. | 370/392 |
| 8,306,058 B2* | 11/2012 | Bai et al. | 370/468 |
| 8,437,284 B2* | 5/2013 | Plamondon et al. | 370/293 |
| 8,804,754 B1* | 8/2014 | Bai et al. | 370/412 |
| 2004/0037224 A1 | 2/2004 | Choi et al. | |
| 2008/0209297 A1 | 8/2008 | Chandra et al. | |
| 2009/0083601 A1 | 3/2009 | Gorokhov et al. | |
| 2010/0153809 A1 | 6/2010 | Duan et al. | |

FOREIGN PATENT DOCUMENTS

| | | | |
|---|---|---|---|
| CN | 101197640 A | 6/2008 | |
| CN | 101292458 A | 10/2008 | |
| CN | 101340387 A | 1/2009 | |
| WO | WO 2005064840 A1 | 7/2005 | |
| WO | WO 2007050231 A2 | 5/2007 | |
| WO | WO 2008097003 A1 | 8/2008 | |

OTHER PUBLICATIONS

International Search Report in corresponding PCT Patent Application No. PCT/CN2011/075171 (Sep. 8, 2011).

"Transmission Control Protocol," Sep. 1981, Information Sciences Institute, University of Southern California, Marina Del Rey, California.

Allman et al., "TCP Congestion Control," Apr. 1999, The Internet Society, Reston, Virginia.

R. Stewart, Ed., "Stream Control Transmission Protocol," Sep. 2007, Internet Engineering Task Force, Fremont, California.

$1^{st}$ Office Action in corresponding Chinese Patent Application No. 201010280868.3 (Mar. 6, 2013).

Written Opinion of the International Searching Authority in corresponding PCT Patent Application No. PCT/CN2011/075171 (Sep. 8, 2011).

Extended European Search Report in corresponding European Patent Application No. 11783063.8 (Jun. 17, 2013).

* cited by examiner

METHOD, APPARATUS AND SYSTEM FOR SENDING AND RECEIVING A MEDIA STREAM

CROSS-REFERENCE TO RELATED APPLICATIONS

This application is a continuation of International Patent Application No. PCT/CN2011/075171, filed on Jun. 2, 2011, which claims priority to Chinese Patent Application No. 201010280868.3, filed on Sep. 10, 2010, both of which are hereby incorporated by reference in their entireties.

FIELD OF THE INVENTION

The present invention relates to the field of communications technologies, and in particular, to a method, an apparatus and a system for sending and receiving a media stream.

BACKGROUND OF THE INVENTION

With constant development of a network access technology and improvement of the capability of a terminal, multimedia (for example, audio and video) content is distributed to a plurality of terminals (such as a television set, a computer and a mobile phone). The multimedia content is generally borne and distributed by using an Internet Protocol (IP) technology. However, due to reasons such as network congestion, line noise, and a device fault, a case of network packet loss is unavoidable. In order to ensure reliable transmission of the multimedia content, a transmission protocol, such as the Transmission Control Protocol (TCP) or the Stream Control Transmission Protocol (SCTP), with a packet loss repairing function at a transport layer of a TCP/IP protocol stack, is generally adopted to bear the multimedia content.

A packet loss repair mechanism at a transport layer of a reliable transmission protocol, such as TCP or SCTP, is essentially a limited retransmission mechanism. Taking TCP as an example, after receiving three consecutive repeated acknowledgement packets, a sender starts a fast retransmission mechanism. If a fast retransmitted packet is also lost, subsequently, retransmission is started according to a set timer. Retransmission intervals are getting larger, and common subsequent retransmission time intervals are 0.5 second, 1 second, 2 seconds, 4 seconds and 8 seconds. If the last retransmission fails, this TCP connection is disconnected.

In a process of implementing the present invention, the inventor finds that the prior art at least has the following problems: The packet loss repair mechanism at the transport layer of TCP and SCTP has a tough characteristic of "repairing until a crash", that is, if and only if a retransmission repair is successful, subsequent application layer content is sent, and once the retransmission repair fails, the connection is disconnected. For transmission of a real-time streaming media, an existing packet loss repair mechanism of a reliable transmission protocol may cause a screen mess of a picture, a picture jitter or pause, and even a program interrupt, which severely influences picture quality.

SUMMARY OF THE INVENTION

Embodiments of the present invention provide a method, an apparatus and a system for sending and receiving a media stream, so as to ensure uninterrupted transmission of a real-time streaming media and smooth picture display at a terminal, and improve picture quality.

An embodiment of the present invention provides a method for sending a media stream, including:

during a process of sending a media stream to a receiving end, if packet loss is detected, retransmitting a lost data packet to the receiving end;

if the lost data packet is not successfully received by the receiving end within a set retransmission threshold, sending retransmission suppression information to the receiving end, for instructing the receiving end to stop requesting the retransmission of the lost data packet; and sending a next data packet of the lost data packet in the media stream to the receiving end.

An embodiment of the present invention provides a method for receiving a media stream, including:

during a process of receiving a media stream sent by a sending end, if packet loss is detected, requesting retransmission of a lost data packet from the sending end; and if the lost data packet is not successfully received in a set retransmission threshold, sending retransmission suppression information to the sending end, for instructing the sending end to stop the retransmission of the lost data packet and send a next data packet of the lost data packet in the media stream.

An embodiment of the present invention further provides another method for sending a media stream, including:

during a process of sending a media stream to a receiving end, if packet loss is detected, retransmitting a lost data packet to the receiving end; and if retransmission suppression information returned by the receiving end is received, stopping retransmission of the lost data packet according to an instruction of the retransmission suppression information, and sending a next data packet of the lost data packet in the media stream.

An embodiment of the present invention further provides another method for receiving a media stream, including:

during a process of receiving a media stream sent by a sending end, if packet loss is detected, requesting retransmission of a lost data packet from the sending end; and if retransmission suppression information sent by the sending end is received, stopping, according to an instruction of the retransmission suppression information, requesting the retransmission of the lost data packet; and receiving a next data packet of the lost data packet in the media stream sent by the sending end.

An embodiment of the present invention provides an apparatus for sending a media stream, including:

a first processing module, configured to, during a process of sending a media stream to a receiving end, if packet loss is detected, retransmit a lost data packet to the receiving end;

a second processing module, configured to, if the lost data packet is not successfully received by the receiving end within a set retransmission threshold, send retransmission suppression information to the receiving end, for instructing the receiving end to stop requesting retransmission of the lost data packet; and a third processing module, configured to send a next data packet of the lost data packet in the media stream to the receiving end.

An embodiment of the present invention provides an apparatus for receiving a media stream, including:

a thirteenth processing module, configured to, during a process of receiving a media stream sent by a sending end, if packet loss is detected, request retransmission of a lost data packet from the sending end;

a fourteenth processing module, configured to, if retransmission suppression information sent by the sending end is received, stop, according to an instruction of the retransmission suppression information, requesting the retransmission of the lost data packet; and a fifteenth processing module, configured to receive a next data packet of the lost data packet in the media stream sent by the sending end.

An embodiment of the present invention further provides a network system, including the foregoing apparatus for sending a media stream and the foregoing apparatus for receiving a media stream.

An embodiment of the present invention provides an apparatus for receiving a media stream, including:

a sixth processing module, configured to, during a process of receiving a media stream sent by a sending end, if packet loss is detected, request retransmission of a lost data packet from the sending end; and a seventh processing module, configured to, if the lost data packet is not successfully received within a set retransmission threshold, send retransmission suppression information to the sending end, for instructing the sending end to stop the retransmission of the lost data packet and send a next data packet of the lost data packet in the media stream.

An embodiment of the present invention further provides another apparatus for sending a media stream, including:

an eleventh processing module, configured to, during a process of sending a media stream to a receiving end, if packet loss is detected, retransmit a lost data packet to the receiving end; and a twelfth processing module, configured to, if retransmission suppression information returned by the receiving end is received, stop retransmission of the lost data packet according to an instruction of the retransmission suppression information, and send a next data packet of the lost data packet in the media stream.

An embodiment of the present invention provides another network system, including the foregoing apparatus for sending a media stream and the foregoing apparatus for receiving a media stream.

In the method, apparatus and system for sending and receiving a media stream that are provided by the embodiments of the present invention, during a transmission process of media content, if the packet loss occurs, and if retransmission still does not succeed after the retransmission has been attempted for finite times, abandoning a retransmission operation on the lost packet is indicated through the retransmission suppression information, and subsequent transmission of the media stream is continued, which ensures uninterrupted transmission of the media stream, and avoids phenomena of a screen mess of a picture, a picture jitter or pause, and even a program interrupt, thereby improving the picture quality.

BRIEF DESCRIPTION OF THE DRAWINGS

To illustrate technical solutions according to embodiments of the present invention more clearly, accompanying drawings to be used in the description of the embodiments are introduced briefly in the following. Apparently, the accompanying drawings in the following description are only some embodiments of the present invention, and a person having ordinary skill in the art can derive other drawings from these accompanying drawings without making creative efforts.

DETAILED DESCRIPTION OF THE EMBODIMENTS

In order to make objectives, technical solutions, and advantages of the present invention more comprehensible, technical solutions according to embodiments of the present invention are clearly and completely described in the following with reference to accompanying drawings. Apparently, the described embodiments are merely part rather than all of the embodiments of the present invention. All other embodiments obtained by a person having ordinary skill in the art based on the embodiments of the present invention without creative efforts fall within the protection scope of the present invention.

In order to ensure reliable transmission of multimedia content, a reliable transmission protocol, such as TCP or SCTP, is generally adopted to bear the multimedia content in an existing network. Because packet loss repair mechanism at a transport layer of TCP and SCTP has a characteristic of "repairing until a crash", "repairing until a crash" described in this document indicates that if and only if a retransmission repair is successful, transmission of a subsequent data packet is continued, and if the retransmission repair fails, a connection is disconnected. For transmission of a real-time streaming media, the repair mechanism of "repairing until a crash" causes congestion which is at an application layer and leads to a severe screen mess of a picture, program buffer underflow which leads to a picture jitter or pause, and even network disconnection which leads to a program interrupt, which severely influences picture quality.

For the foregoing defects, the embodiments of the present invention provide a solution, which avoids existing defects caused by the repair mechanism of "repairing until a crash" of the TCP and the SCTP. Specifically, in the embodiments of the present invention, for a real-time media stream borne over a reliable transmission protocol, the repair mechanism of "repairing until a crash" is replaced by a repair mechanism of "packet loss tolerance", thereby improving the picture quality. The "packet loss tolerance" described in this document indicates that, after a network detects a packet loss, finite times of retransmission are performed, and if a retransmission operation does not succeed within a set retransmission threshold, the retransmission operation on a lost packet is stopped, and transmission of a subsequent part of media stream is continued, so as to ensure uninterrupted real-time transmission of the media stream.

Figure 1:
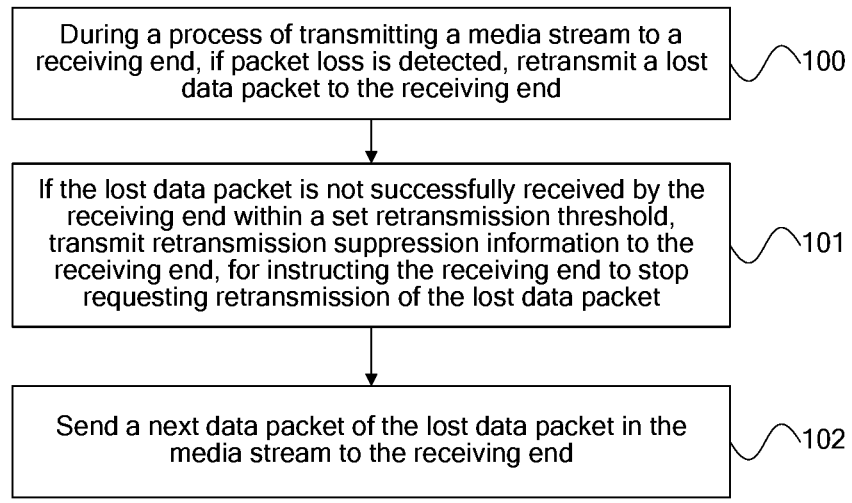
FIG. 1 is a flow chart of a first embodiment of a method for sending a media stream according to the present invention.

FIG. 1 is a flow chart of a first embodiment of a method for sending a media stream according to the present invention. As shown in FIG. 1, the method includes:

Step 100: During a process of sending a media stream to a receiving end, if packet loss is detected, send a lost data packet to the receiving end.

A sending end establishes a transport layer connection (for example, a TCP or SCTP connection) with the receiving end, and then performs real-time transmission of a data packet. The sending end may perform sending in order according to a sequence number of a data packet of a media stream of a multimedia service. After the sending end sends a data packet to the receiving end, if the receiving end successfully receives the data packet, the receiving end returns, to the sending end, a success acknowledgement message indicating that the data packet is already successfully received. If in a subsequent period of time, the sending end does not receive the success acknowledgement message or receives a request that requests lost packet retransmission and is returned by the receiving end, it indicates that the receiving end does not successfully receive the data packet, that is to say, a phenomenon of "packet loss" occurs. After the packet loss is detected, the sending end may send the lost data packet to the receiving end.

Step 101: If the lost data packet is not successfully received by the receiving end within a set retransmission threshold, send retransmission suppression information to the receiving end, for instructing the receiving end to stop requesting retransmission of the lost data packet.

The sending end sends the lost data packet to the receiving end. In order to avoid an occurrence of an existing defect of "repairing until a crash", times of the retransmission need to be limited in the embodiment of the present invention. Specifically, in the embodiment of the present invention, the retransmission is limited by setting the retransmission threshold, for example, a threshold of retransmission times or an accumulated delay threshold, or a combination of the two. That is, if the retransmission does not succeed within a range limited by the retransmission threshold, the retransmission is stopped, and transmission of a subsequent part of media stream of the multimedia service is continued. That is to say, a repair mechanism of "packet loss tolerance" is adopted in the embodiment of the present invention. If within the set retransmission threshold, a retransmitted data packet is still not successfully received by the receiving end though the sending end performs a retransmission operation several times on the lost data packet, and when the retransmission threshold is reached, the sending end sends retransmission suppression information to the receiving end. The retransmission suppression information is used to instruct the receiving end to stop requesting the retransmission of the lost data packet, that is, to notify the receiving end of stopping, according to a preset repair mechanism of "packet loss tolerance", sending the retransmission request again, and the sending end continues to transmit the subsequent part of media stream of the multimedia service according to the preset repair mechanism.

Step 102: send a next data packet of the lost data packet in the media stream to the receiving end.

After sending the retransmission suppression information to the receiving end, the sending end obtains, in the media stream of the multimedia service and according to the sequence number of the data packet, the next data packet of the lost data packet, and then sends the obtained data packet to the receiving end. In this case, the lost data packet is still not successfully received by the receiving end, but in order not to interrupt real-time transmission of the media stream of the multimedia service, in the embodiment of the present invention, the retransmission operation on the lost packet is abandoned after the retransmission has been attempted for finite times. Though several data packets in the media stream that is of the multimedia service and received by the receiving end are lost, most of the media stream of the multimedia service may still be successfully received, so the loss of the several data packets does not cause interruption in the transmission of the media stream of the multimedia service.

In the method for sending a media stream provide by the embodiment of the present invention, if retransmission still does not succeed after the retransmission has been attempted for finite times, it is notified, through the retransmission suppression information, that the retransmission operation on the lost packet is abandoned, and the transmission of the subsequent part of media stream of the multimedia service is continued, which ensures uninterrupted transmission of the media stream of the multimedia service, and avoids phenomena of a picture jitter or pause and even a program interrupt caused by disconnection of the network connection, thereby improving the smoothness of picture display.

Figure 2:
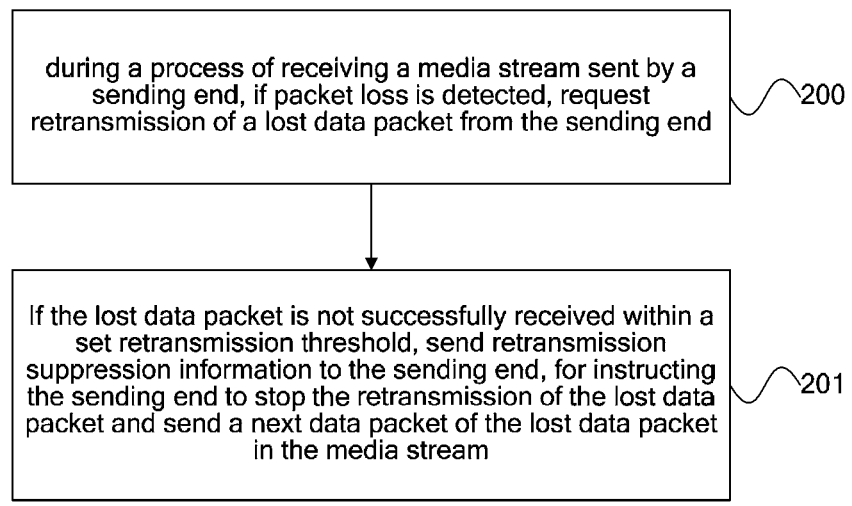
FIG. 2 is a flow chart of a second embodiment of a method for receiving a media stream according to the present invention.

FIG. 2 is a flow chart of a second embodiment of a method for receiving a media stream according to the present invention. As shown in FIG. 2, the method includes:

Step 200: During a process of receiving a media stream sent by a sending end, if packet loss is detected, request retransmission of a lost data packet from the sending end.

The sending end establishes a transport layer connection (for example, a TCP or SCTP connection) with a receiving end, and then performs real-time transmission of a data packet. The sending end may perform sending in order according to a sequence number of a data packet of a media stream of a multimedia service. When the receiving end detects, according to the sequence number of the data packet, that the packet loss occurs during a process that the sending end sends the media stream of the multimedia service, the receiving end requests the retransmission of the lost data packet from the sending end.

Step 201: If the lost data packet is not successfully received within a set retransmission threshold, send retransmission suppression information to the sending end, for instructing the sending end to stop the retransmission of the lost data packet and send a next data packet of the lost data packet in the media stream of the multimedia service.

After the receiving end sends a retransmission request to the sending end, the sending end needs to retransmit the lost data packet that is requested to be retransmitted. In order to avoid an occurrence of an existing defect of "repairing until a crash", times of the retransmission need to be limited the embodiment of the present invention. Specifically, in the embodiment of the present invention, the retransmission is limited by setting a retransmission threshold. That is, if the retransmission does not succeed within a range limited by the retransmission threshold, the retransmission is stopped, and transmission of a subsequent part of media stream of the multimedia service is continued. That is to say, a repair mechanism of "packet loss tolerance" is adopted in the embodiment of the present invention. If within the set retransmission threshold, the lost data packet is still not successfully received though the receiving end sends the retransmission request for several times, and when the retransmission threshold is reached, the receiving end sends retransmission suppression information to the sending end. The retransmission suppression information is used to notify the sending end of stopping the retransmission of the lost data packet according to a preset repair mechanism of "packet loss tolerance" and request the sending end to send the next data packet of the lost data packet in the media stream of the multimedia service. After receiving the retransmission suppression information, the sending end may continue, according to arrangement, to transmit the subsequent part of media stream of the multimedia service according to the sequence number, which ensures uninterrupted real-time transmission of the media stream.

In the method for receiving a media stream provide by the embodiment of the present invention, if retransmission still does not succeed after the retransmission has been attempted for finite times, it is notified, through the retransmission suppression information, that the retransmission operation on the lost packet is abandoned, and the transmission of the subsequent part of media stream of the multimedia service is continued, which ensures uninterrupted transmission of the media stream of the multimedia service, and avoids phenomena of a severe screen mess of a picture caused by congestion at an application layer, a picture jitter or pause caused by program buffer underflow, and even a program interrupt caused by disconnection of the network connection, thereby improving picture quality.

The methods for sending and receiving a media stream that are provided by the foregoing embodiments aim at a real-time media stream borne over a reliable transmission protocol, where "repairing until a crash" is replaced by the "packet loss tolerance". It should be noted that each of the embodiments of the present invention aims at the media stream of the multimedia service rather than a signaling stream of the multimedia service. For reliable transmission of the signaling stream of the multimedia service, the reliability should be ensured, that is, if a repair fails, a connection needs to be disconnected. For the signaling stream of the multimedia service, it is required to ensure the reliable transmission, that is, to cancel a characteristic of "packet loss tolerance", and restore a characteristic of "repairing until a crash". When starting and ending sending the media stream of the multimedia service, the application layer may set, through an application programming interface (hereinafter referred to as API) function, an attribute of a socket corresponding to a transport layer connection bearing the multimedia service, so as to cancel or restore the characteristic of "repairing until a crash".

In the methods for sending and receiving a media stream that are provided by the foregoing embodiments, the retransmission threshold includes a threshold of retransmission times, or an accumulated delay threshold, or the threshold of retransmission times and the accumulated delay threshold. The retransmission threshold is required to ensure that decoding buffer underflow of the receiving end does not occur, and/or to be lower than buffer aging time of the sending end and decoding buffer aging time of a terminal. The retransmission threshold may also be set, through the API function, on a socket corresponding to a transport layer session connection. The foregoing receiving end may be a terminal or a home gateway. The foregoing sending end may be a streaming server or a network device provided with a streaming function.

In addition, the methods for sending and receiving a media stream that are provided by the foregoing embodiments also include a step of setting the retransmission threshold at the sending end and/or the receiving end. The step of setting the retransmission threshold may be finished before the sending end and/or the receiving end detects the packet loss, and may also be performed after the packet loss is detected and before the lost data packet is sent to the receiving end. That is to say, the retransmission threshold may be set after the packet loss is detected, and may also be performed after the transmission of the real-time media stream is started and before the packet loss is detected. This means that a retransmission policy (including the retransmission threshold) for the real-time media stream may be set after transmission of the signaling stream is ended and before the transmission of the real-time media stream is started, and may also be set for a single packet loss event after the packet loss is detected.

In addition, if a network is in a very bad condition, for example, continuous congestion and a high line noise, multiple times of continuous retransmission may occur. In a case that the network cannot bear a real-time media stream service, the retransmission policy may be further set as that: if multiple times of retransmission occur in a short time, the quality of the real-time media stream decreases to an unacceptable state, and the connection is disconnected.

As described above, retransmission suppression may be initiated by the sending end, and may also be initiated by the receiving end. If the retransmission suppression is initiated by a sending end of a real-time media stream, retransmission suppression information is only used to suppress a subsequent retransmission request of a peer end. After sending the retransmission suppression information, the sending end directly ends retransmission and sends a subsequent part of media stream of a multimedia service. If the retransmission suppression is initiated by a receiving end of the real-time media stream, retransmission suppression information not only is used to end the retransmission and suppress subsequent retransmission of data of a peer end, but also carries information for requesting the opposite party to send a subsequent data stream. The method in each embodiment of the present invention is essentially to limit influence of "in-band retransmission" in an acceptable range through the "retransmission suppression". The "in-band retransmission" in this document means that retransmission occurs on a same transport layer session connection (for example, a TCP connection).

Figure 3:
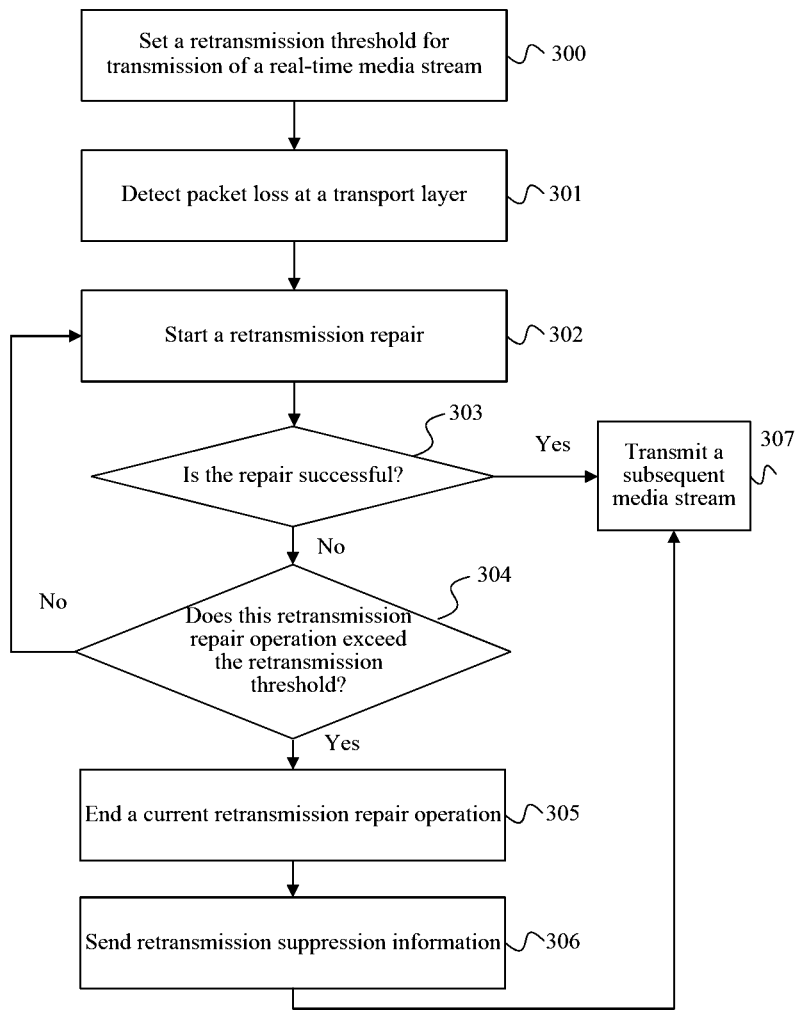
FIG. 3 is a flow chart of a third embodiment of a method for sending a media stream according to the present invention.

FIG. 3 is a flow chart of a third embodiment of a method for sending a media stream according to the present invention. As shown in FIG. 3, a procedure that a sending end of a real-time media stream initiates retransmission suppression is described, where a retransmission threshold is set before packet loss is detected. The method includes:

Step 300: The sending end transmits the real-time media stream, and sets the retransmission threshold, for example, a threshold of retransmission times and/or an accumulated delay threshold.

Step 301: The sending end detects packet loss at a transport layer.

Step 302: The sending end starts a retransmission repair procedure, and sends a lost data packet to a receiving end.

Step 303: The sending end determines whether a repair is successful, that is, whether the lost packet is successfully received by the receiving end; if successful, performs step 307; and if not successful, performs step 304.

Step 304: The sending end determines whether this retransmission repair operation exceeds the retransmission threshold, for example, whether it is larger than the threshold of retransmission times and/or the accumulated delay threshold; if exceeds, performs step 305; and if does not exceed, returns to perform step 302.

Step 305: The sending end ends a current retransmission operation.

Step 306: The sending end sends retransmission suppression information to the receiving end.

Step 307: The sending end continues to send a subsequent part of media stream of a multimedia service.

Figure 4:
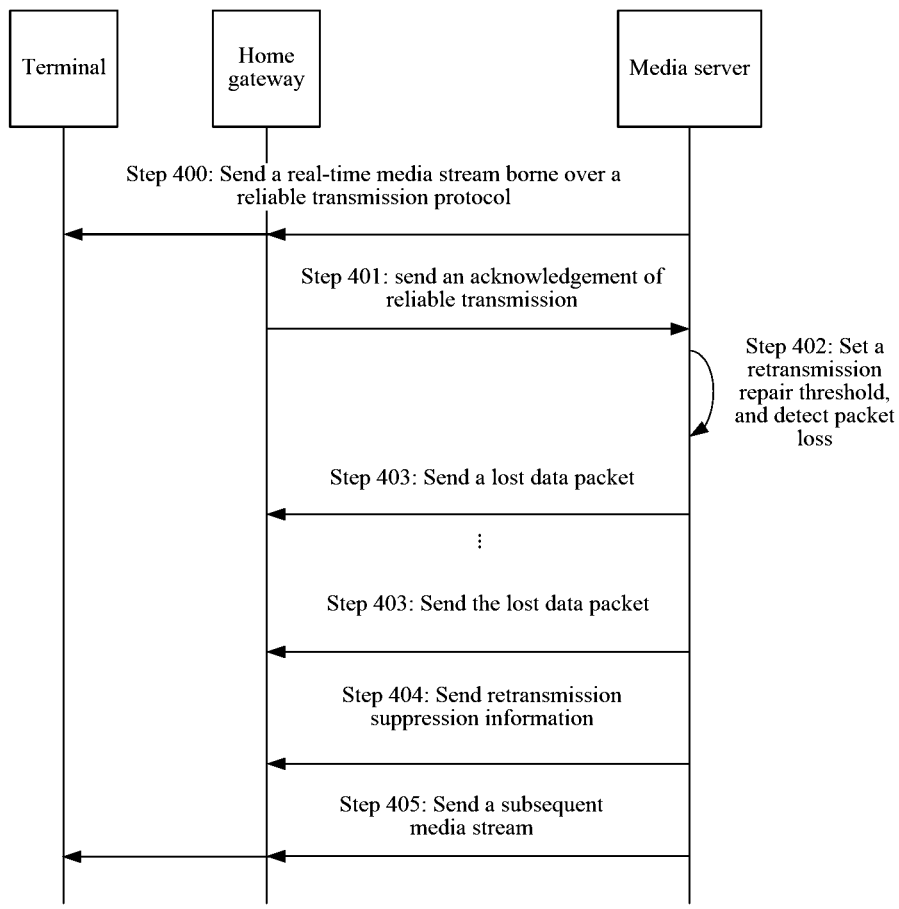
FIG. 4 is a flow chart of a fourth embodiment of a method for sending a media stream according to the present invention.

FIG. 4 is a flow chart of a fourth embodiment of a method for sending a media stream according to the present invention. As shown in FIG. 4, a procedure that a sending end of a real-time media stream initiates retransmission suppression is described with a media server as an example, where a home gateway serves as a receiving agent of the real-time media stream, and a retransmission threshold is set before packet loss is detected. The method includes:

Step 400: The media server sends, through the home gateway, a terminal a real-time media stream borne over a reliable transmission protocol.

Step 401: The home gateway returns an acknowledgement of reliable transmission to the media server.

Step 402: After setting the retransmission repair threshold, the media server detects packet loss at a transport layer and initiates a retransmission operation.

Step 403: The media server sends a lost data packet to the home gateway.

Step 404: The media server sends retransmission suppression information to the home gateway, if it is determined that a retransmission repair operation exceeds the retransmission threshold.

Step 405: The media server continues to send, through the home gateway, the terminal a subsequent part of media stream of a multimedia service.

Figure 5:
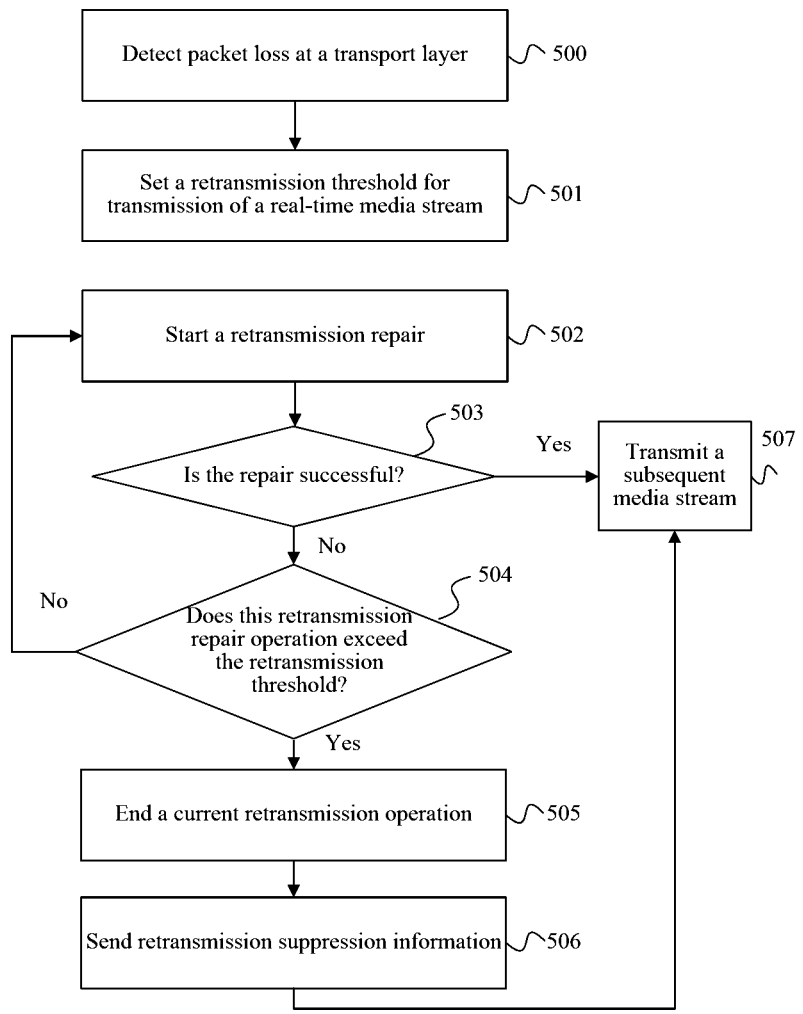
FIG. 5 is a flow chart of a fifth embodiment of a method for sending a media stream according to the present invention.

FIG. 5 is a flow chart of a fifth embodiment of a method for sending a media stream according to the present invention. As shown in FIG. 5, a procedure that a sending end of a real-time media stream initiates retransmission suppression is described, where a retransmission threshold is set after packet loss is detected and before a retransmission repair is started. The method includes:

Step 500: The sending end detects packet loss at a transport layer.

Step 501: The sending end transmits a real-time media stream and sets the retransmission threshold, for example, a threshold of retransmission times and/or an accumulated delay threshold.

Step 502: The sending end starts a retransmission repair procedure, and sends a lost data packet to a receiving end.

Step 503: The sending end determines whether a repair is successful, that is, whether the lost packet is successfully received by the receiving end; if successful, performs step 507; and not successful, performs step 504.

Step 504: The sending end determines whether this retransmission repair operation exceeds the retransmission threshold, for example, whether it is larger than the threshold of retransmission times and/or the accumulated delay threshold; if exceeds, performs step 505; and if does not exceed, returns to perform step 502.

Step 505: The sending end ends a current retransmission operation.

Step 506: The sending end sends retransmission suppression information to the receiving end.

Step 507: The sending end continues to transmit a subsequent part of media stream of a multimedia service.

Figure 6:
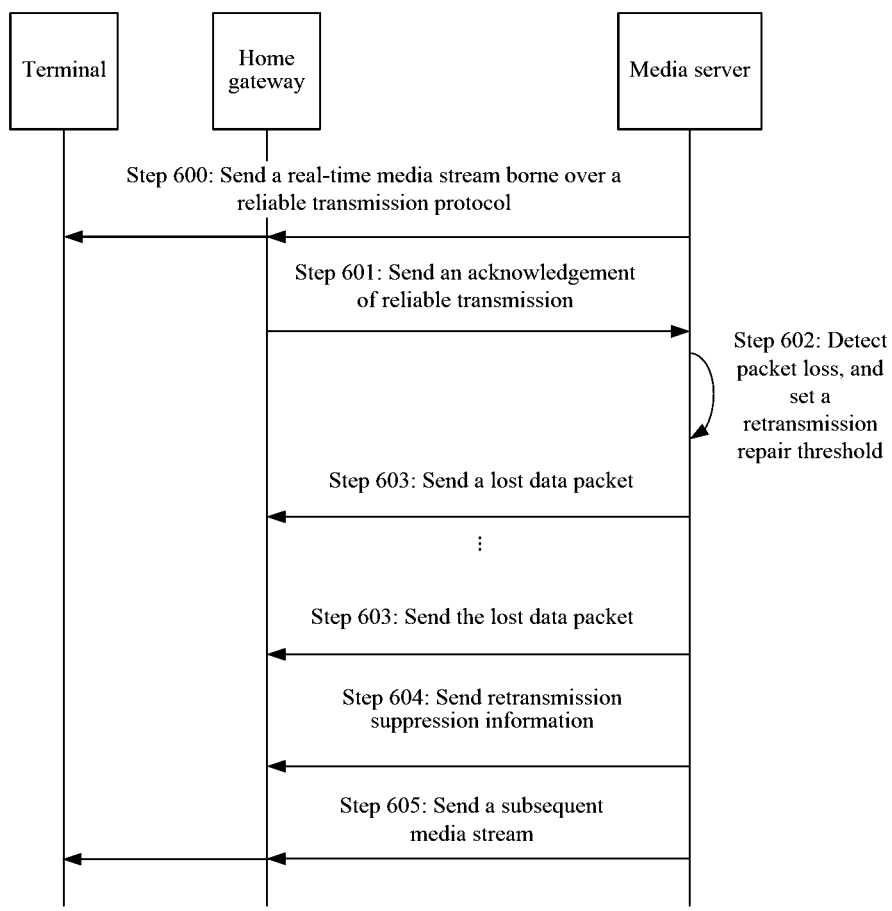
FIG. 6 is a flow chart of a sixth embodiment of a method for sending a media stream according to the present invention.

FIG. 6 is a flow chart of a sixth embodiment of a method for sending a media stream according to the present invention. As shown in FIG. 6, a procedure that a sending end of a real-time media stream initiates retransmission suppression is described with a media server as an example, where a home gateway serves as a receiving agent of the real-time media stream, and a retransmission threshold is set after packet loss is detected and before a retransmission repair is started. The method includes:

Step 600: The media server sends, through the home gateway, a terminal a real-time media stream borne over a reliable transmission protocol.

Step 601: The home gateway returns an acknowledgement of reliable transmission to the media server.

Step 602: The media server detects packet loss at a transport layer, and then sets a retransmission repair threshold and initiates a retransmission operation.

Step 603: The media server sends a lost data packet to the home gateway.

Step 604: The media server sends retransmission suppression information to the home gateway, if it is determined that a retransmission repair operation exceeds the retransmission threshold.

Step 605: The media server continues to send, through the home gateway, the terminal a subsequent part of media stream of a multimedia service.

Figure 7:
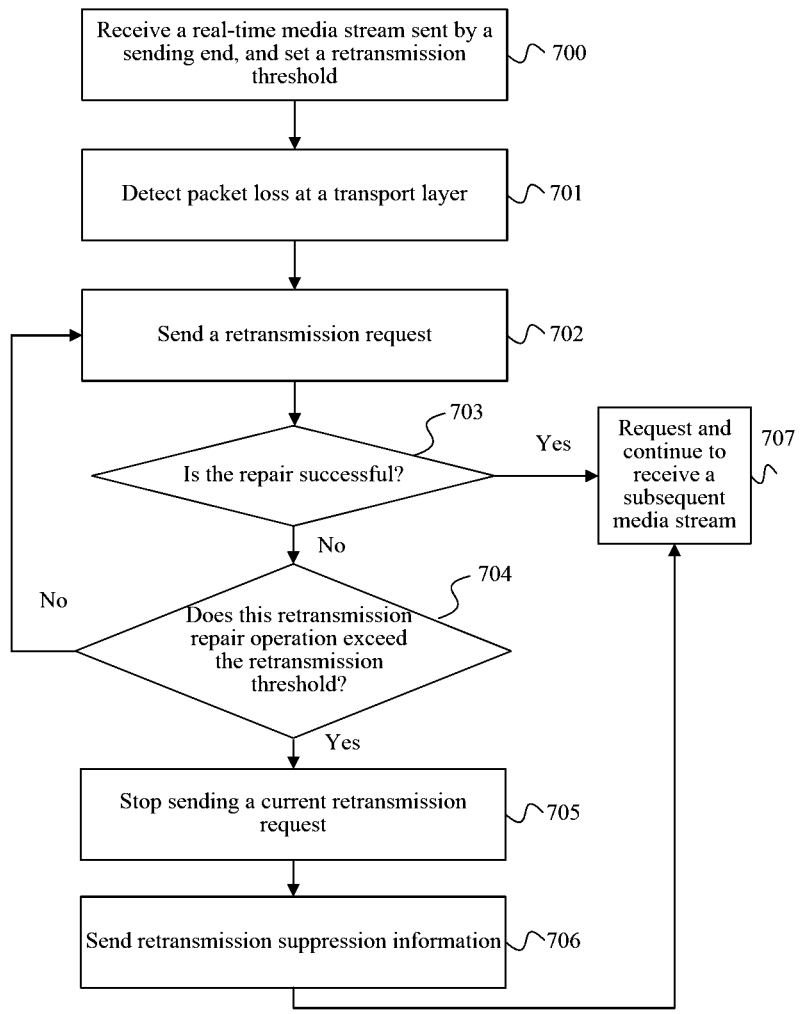
FIG. 7 is a flow chart of a seventh embodiment of a method for receiving a media stream according to the present invention.

FIG. 7 is a flow chart of a seventh embodiment of a method for receiving a media stream according to the present invention. As shown in FIG. 7, a procedure that a receiving end of a real-time media stream initiates retransmission suppression is described, where a retransmission threshold is set before packet loss is detected. The method includes:

Step 700: The receiving end receives a real-time media stream sent by a sending end, and sets the retransmission threshold, for example, a threshold of retransmission times and/or an accumulated delay threshold.

Step 701: The receiving end detects packet loss at a transport layer.

Step 702: The receiving end starts a retransmission repair procedure, and sends the sending end a request for retransmitting a lost data packet.

Step 703: The receiving end determines whether a repair is successful, that is, whether the lost data packet is successfully received; if successful, performs step 707; and if not successful, performs step 704.

Step 704: The receiving end determines whether this retransmission repair operation exceeds the retransmission threshold, for example, whether it is larger than the threshold of retransmission times and/or the accumulated delay threshold; if exceeds, performs step 705; and if does not exceed, returns to perform step 702.

Step 705: The receiving end stops sending a current retransmission request.

Step 706: The receiving end sends retransmission suppression information to the sending end.

Step 707: The receiving end requests and continues to receive a subsequent part of media stream of a multimedia service.

Figure 8:
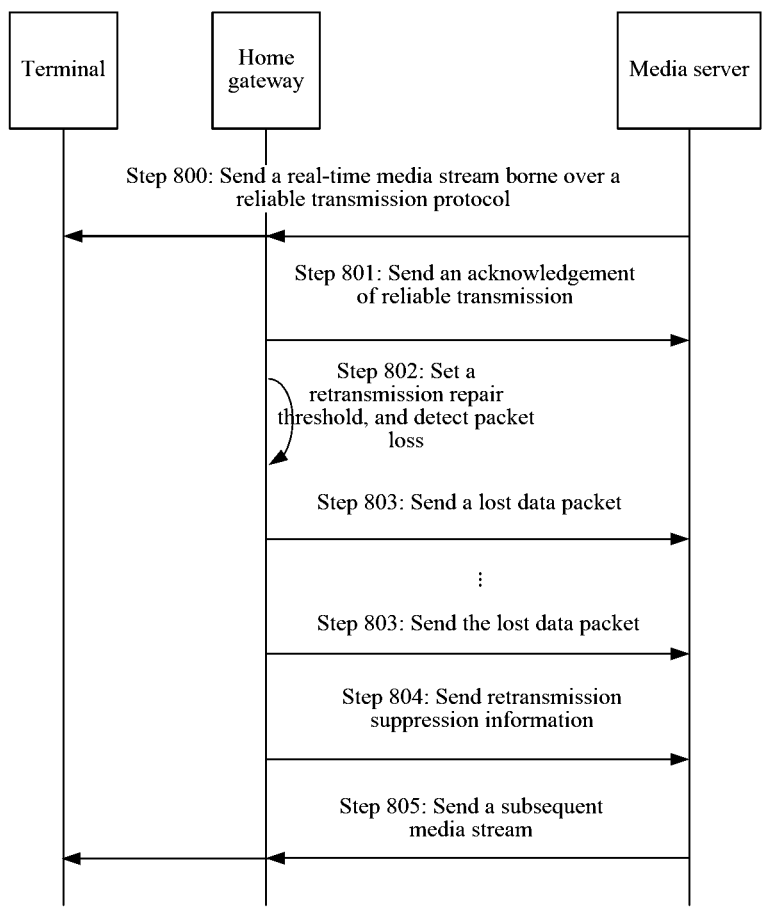
FIG. 8 is a flow chart of an eighth embodiment of a method for receiving a media stream according to the present invention.

FIG. 8 is a flow chart of an eighth embodiment of a method for receiving a media stream according to the present invention. As shown in FIG. 8, a procedure that a receiving end of a real-time media stream initiates retransmission suppression is described with a home gateway as an example, where the home gateway serves as a receiving agent of the real-time media stream, and a retransmission threshold is set before packet loss is detected. The method includes:

Step 800: A media server sends, through the home gateway, a terminal a real-time media stream borne over a reliable transmission protocol.

Step 801: The home gateway returns an acknowledgement of reliable transmission to the media server.

Step 802: After setting a retransmission repair threshold, the home gateway detects packet loss at a transport layer and initiates a retransmission operation.

Step 803: The home gateway sends the media server a request for retransmitting a lost data packet.

Step 804: The home gateway sends retransmission suppression information to the media server, if it is determined that a retransmission request operation exceeds the retransmission threshold.

Step 805: The media server continues to send, through the home gateway, the terminal a subsequent part of media stream of a multimedia service.

Figure 9:
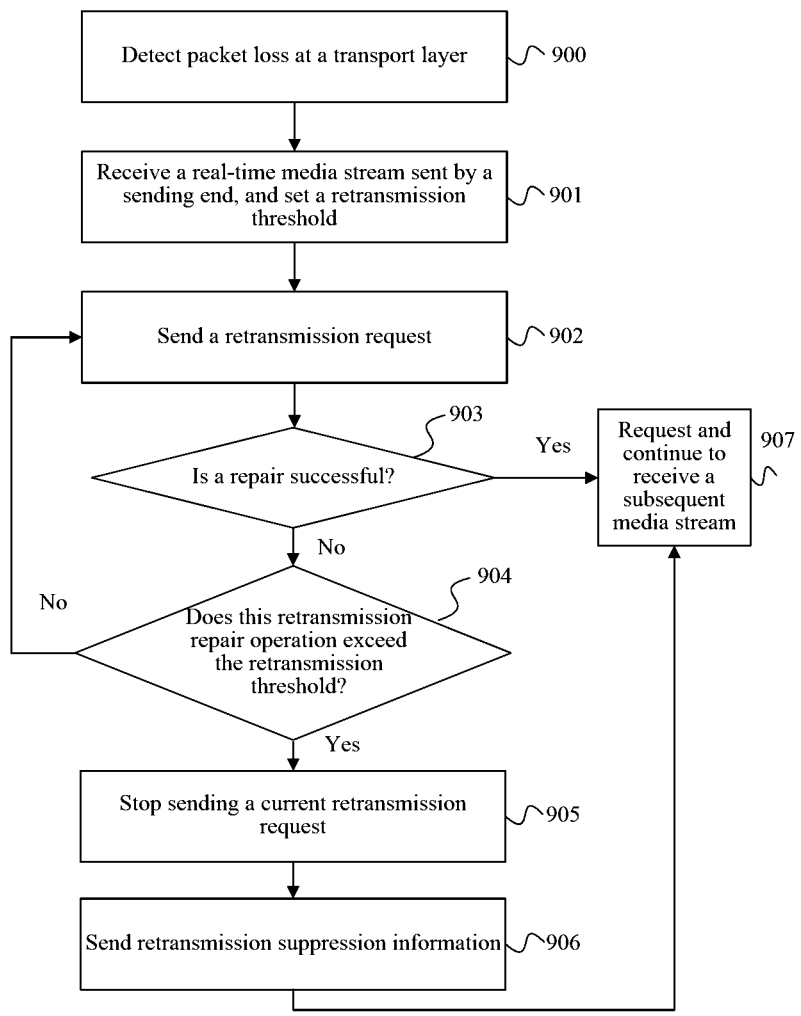
FIG. 9 is a flow chart of a ninth embodiment of a method for receiving a media stream according to the present invention.

FIG. 9 is a flow chart of a ninth embodiment of a method for receiving a media stream according to the present invention. As shown in FIG. 9, a procedure that a receiving end of a real-time media stream initiates retransmission suppression is described, where a retransmission threshold is set after packet loss is detected and before a retransmission repair is started. The method includes:

Step 900: The receiving end detects packet loss at a transport layer.

Step 901: The receiving end receives a real-time media stream sent by a sending end, and sets the retransmission threshold, for example, a threshold of retransmission times and/or an accumulated delay threshold.

Step 902: The receiving end starts a retransmission repair procedure, and sends the sending end a request for retransmitting a lost data packet.

Step 903: The receiving end determines whether a repair is successful, that is, whether the lost data packet is successfully received; if successful, performs step 907; and if not successful, performs step 904.

Step 904: The receiving end determines whether this retransmission repair operation exceeds the retransmission threshold, for example, whether it is larger than the threshold of retransmission times and/or the accumulated delay threshold; if exceeds, performs step 905; and if does not exceed, returns to perform step 902.

Step 905: The receiving end stops sending a current retransmission request.

Step 906: The receiving end sends retransmission suppression information to the sending end.

Step 907: The receiving end requests and continues to receive a subsequent part of media stream of a multimedia service.

Figure 10:
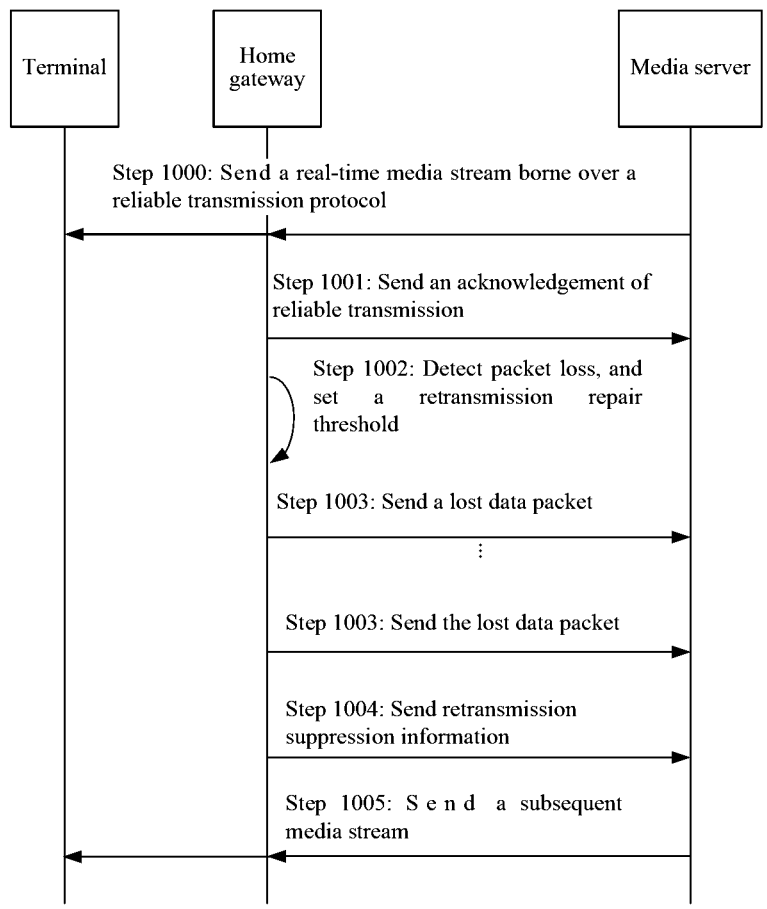
FIG. 10 is a flow chart of a tenth embodiment of a method for receiving a media stream according to the present invention.

FIG. 10 is a flow chart of a tenth embodiment of a method for receiving a media stream according to the present invention. As shown in FIG. 10, a procedure that a receiving end of a real-time media stream initiates retransmission suppression is described with a home gateway as an example, where the home gateway serves as a receiving agent of the real-time media stream, and a retransmission threshold is set after packet loss is detected and before a retransmission repair is started. The method includes:

Step 1000: A media server sends, through the home gateway, a terminal a real-time media stream borne over a reliable transmission protocol.

Step 1001: The home gateway returns an acknowledgement of reliable transmission to the media server.

Step 1002: The home gateway detects packet loss at a transport layer, and then sets a retransmission repair threshold and initiates a retransmission operation.

Step 1003: The home gateway sends the media server a request for retransmitting a lost data packet.

Step 1004: The home gateway sends retransmission suppression information to the media server, if it is determined that a retransmission request operation exceeds the retransmission threshold.

Step 1005: The media server continues to send, through the home gateway, the terminal a subsequent part of media stream of a multimedia service.

In the method provided by each of the foregoing embodiments, the retransmission suppression information is mainly for notifying a peer end of stopping a retransmission repair operation and meanwhile continuing data transmission without disconnecting a transport layer connection. How TCP and SCTP carry the retransmission suppression information to the peer end is introduced in detail in the following.

Figure 11:
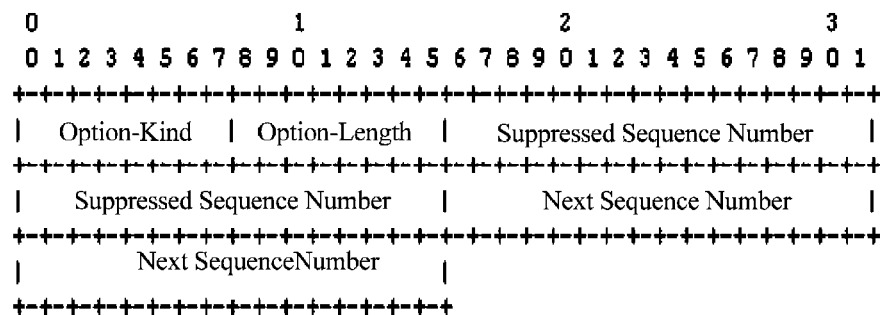
FIG. 11 is a schematic diagram of defining a TCP Option to describe retransmission suppression information according to an embodiment of the present invention.

If a current transport layer connection is a TCP connection, retransmission suppression information may be carried by an "Option" of a TCP header. Specifically, a TCP header Option is defined as "Suppression & Forward". FIG. 11 is a schematic diagram of defining a TCP Option to describe the retransmission suppression information according to an embodiment of the present invention. As shown in FIG. 11, a specific type, for example 60, of Option within the TCP header, that is, "Option", is specified through a protocol specification and is used to identify the "Suppression & Forward". The length of this Option is 10 bytes, which includes 1 byte of the type, 1 byte of the length, 4 bytes of a "Suppressed Sequence Number" for identifying a lost packet to be suppressed, and 4 bytes of a "Next Sequence Number" for identifying an expected "Sequence Number" of a real-time media stream after the retransmission is skipped.

Figure 12:
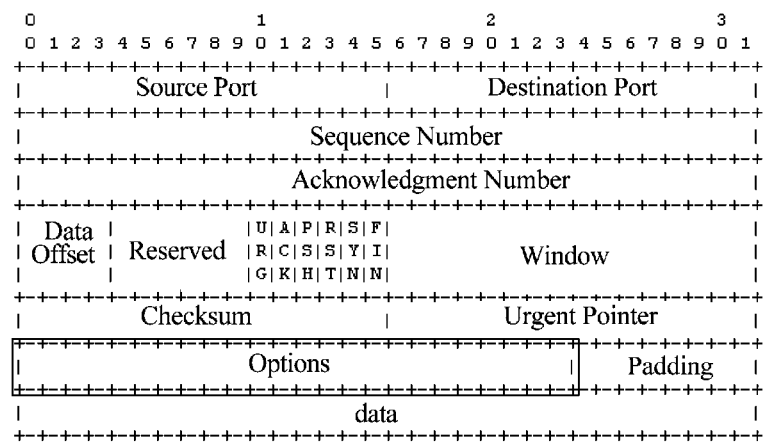
FIG. 12 is a schematic diagram of carrying retransmission suppression information by a TCP Option according to an embodiment of the present invention.

FIG. 12 is a schematic diagram of carrying retransmission suppression information by a TCP Option according to an embodiment of the present invention. As shown in FIG. 12, a sending end and a receiving end of a real-time media stream both may notify a peer end of retransmission suppression by carrying a TCP header Option of a "Suppression & Forward" type.

Figure 13:
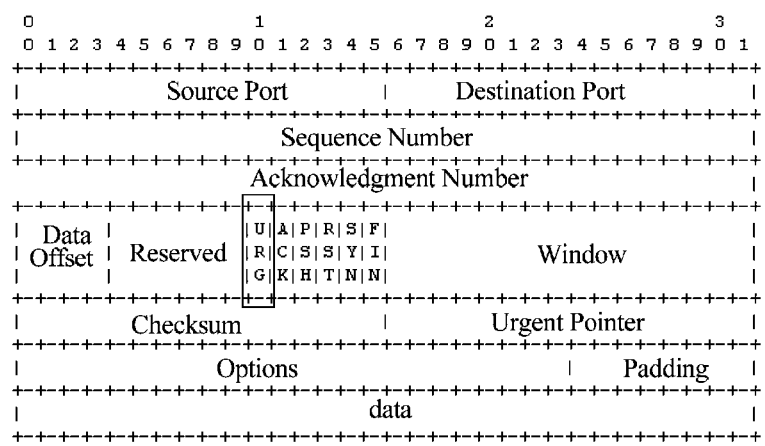
FIG. 13 is a schematic diagram of redefining a TCP Urgent Flag to describe retransmission suppression information according to an embodiment of the present invention.

If a current transport layer connection is a TCP connection, retransmission suppression information may also be carried by an "Urgent Flag" field. Specifically, FIG. 13 is a schematic diagram of redefining a TCP Urgent Flag to describe the retransmission suppression information according to an embodiment of the present invention. As shown in FIG. 13, the Urgent Flag of a TCP header is redefined so that it is given a meaning of "Suppression & Forward". A receiving end of a real-time media stream may notify a peer end of retransmission suppression by setting the Urgent Flag in an acknowledgement message. A sending end of the real-time media stream may notify the peer end of the retransmission suppression by setting the Urgent Flag in a media stream data packet of a multimedia service.

Figure 14:
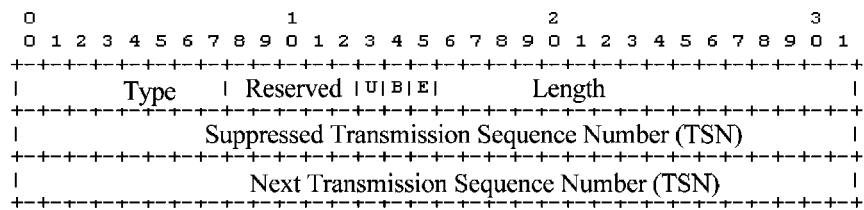
FIG. 14 is a schematic diagram of defining a type of Chunk to describe retransmission suppression information according to an embodiment of the present invention.
Figure 15:
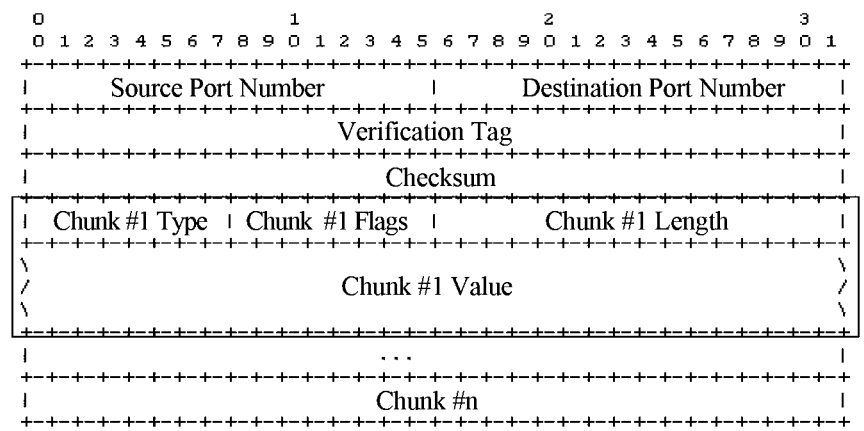
FIG. 15 is a schematic diagram of carrying retransmission suppression information by a Chunk according to an embodiment of the present invention.

If a current transport layer connection is an SCTP connection, retransmission suppression information may be carried by a "Chunk-Type" field in an SCTP header. Specifically, FIG. 14 is a schematic diagram of defining a type of Chunk to describe the retransmission suppression information according to an embodiment of the present invention. As shown in FIG. 14, a Chunk type is defined as "Suppression & Forward". A specific Chunk type, for example 60, that is, a "Type", is specified through a protocol specification to identify the "Suppression & Forward". The length of this Chunk is 12 bytes, which includes 1 byte of the type, 1 byte of a flag, 2 bytes of the length, 4 bytes of a "Suppressed Sequence Number" for identifying a lost packet to be suppressed, and 4 bytes of a "Next Sequence Number" for identifying an expected "Sequence Number" of a real-time media stream after the retransmission is skipped. FIG. 15 is a schematic diagram of carrying retransmission suppression information by a Chunk according to an embodiment of the present invention. As shown in FIG. 15, a sending end and a receiving end of a real-time media stream both may notify a peer end of retransmission suppression by carrying a Chunk of a "Suppression & Forward" type.

Figure 16:
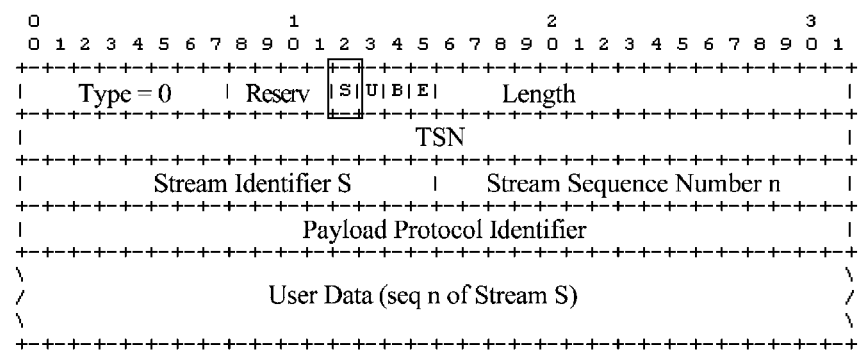
FIG. 16 is a schematic diagram of defining a Chunk Flag of a Payload Data type to describe retransmission suppression information according to an embodiment of the present invention.

If a current transport layer connection is an SCTP connection, retransmission suppression information may also be carried by a "Chunk-Parameter" field in an SCTP header. Specifically, FIG. 16 is a schematic diagram of defining a Chunk Flag of a Payload Data type to describe the retransmission suppression information according to an embodiment of the present invention. As shown in FIG. 16, a flag of a Chunk (Chunk Flag) of the Payload Data type is defined so that it is given a meaning of "Suppression & Forward". A peer end is notified of retransmission suppression by setting the flag. A receiving end of a real-time media stream may notify the peer end of the retransmission suppression by setting an S Flag of the Chunk in an acknowledgement message. A sending end of the real-time media stream may notify the peer end of the retransmission suppression by setting an S Flag in a media stream data packet of a multimedia service.

Figure 17:
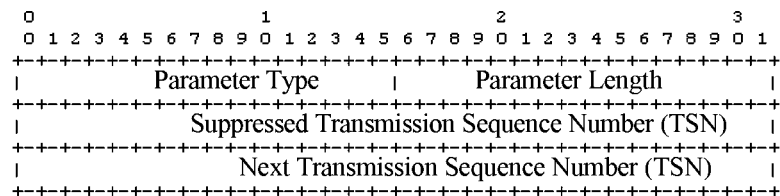
FIG. 17 is a schematic diagram of defining a Chunk Parameter to describe retransmission suppression information according to an embodiment of the present invention.
Figure 18:
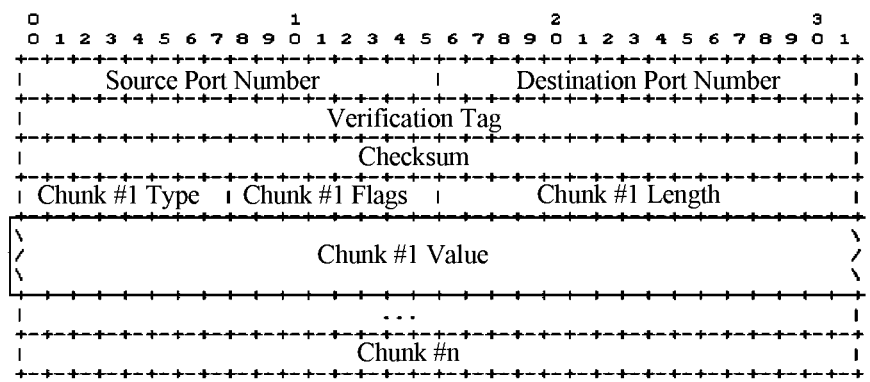
FIG. 18 is a schematic diagram of carrying retransmission suppression information by a Chunk Value (Parameter) according to an embodiment of the present invention.

If a current transport layer connection is an SCTP connection, retransmission suppression information may also be carried by a "Chunk Flag" field in an SCTP header. Specifically, FIG. 17 is a schematic diagram of defining a Chunk Parameter to describe the retransmission suppression information according to an embodiment of the present invention. As shown in FIG. 17, a parameter of a Chunk of a Control type is defined so that it is given a meaning of "Suppression & Forward". A specific Parameter type, for example, 60, that is, a "Type", is specified through a protocol specification to identify the "Suppression & Forward". The length of this Chunk is 12 bytes, which includes 4 bytes of a "Suppressed Sequence Number" for identifying a lost packet to be suppressed, and 4 bytes of a "Next Sequence Number" for identifying a expected "Sequence Number" of a real-time media stream after the retransmission is skipped. FIG. 18 is a schematic diagram of carrying retransmission suppression information by a Chunk Value (Parameter) according to an embodiment of the present invention. As shown in FIG. 18, a sending end and a receiving end of a real-time media stream may both notify a peer end of retransmission suppression by carrying the parameter in a transport layer load by a Chunk of a control type.

As in each of the foregoing embodiments, no matter whether the transport layer connection is the TCP connection or the SCTP connection, the receiving end may also counterfeit acknowledgement message to indicate that the lost data packet is already successfully received. That is to say, the receiving end notifies, by counterfeiting an acknowledgement (ACK), the sending end that the lost packet is already received, even if the lost packet is not successfully repaired. The receiving end of the real-time media stream notifies, by counterfeiting the acknowledgement message, the peer end that the lost packet is already received, so as to implement implicit retransmission suppression.

As in each of the foregoing embodiments, the sending end may also send, in a case that blocking of a real-time sending queue is detected at an application layer, the receiving end the retransmission suppression information, for example, an aging pre-warning of a queue to be sent at the application layer, or a current data packet failure at the application layer. In this case, an instruction for triggering retransmission suppression at the application layer may be sent to the transport layer, which aims at not influencing smooth media decoding of a multimedia service. In addition, the foregoing method also includes that: if the lost data packet is successfully received by the receiving end within the set retransmission threshold, the sending end sends the receiving end a next data packet of the lost data packet in the media stream of the multimedia service.

As in each of the foregoing embodiments, further, after the retransmission is suppressed, because the packet loss exists, the receiving end may also request application layer retransmission. However, a message header of a message is already deleted before the message arrives at the application layer, and therefore, in order to enable the receiving end to know which specific data packet is lost, during the process of sending the media stream of the multimedia service to the receiving end, the sending end in this embodiment may add, to a transport layer load of each data packet in the media stream of the multimedia service, a load identifier for uniquely identifying a data packet. The receiving end identifies, through the load identifier, which data packet is lost. The receiving end detects the packet loss according to the load identifier, and then sends the sending end a request for establishing a new transport layer connection, where a load identifier corresponding to the lost data packet is carried, so as to notify the sending end which data packet needs to be retransmitted. The sending end accepts the request. The sending end and the receiving end establish a new transport layer connection while maintaining an original transport layer connection. The receiving end receives, through the new transport layer connection, the data packet that corresponds to the load identifier and is sent by the sending end.

In the following embodiments, for a real-time media stream borne over a reliable transmission protocol (note that here a media stream of a multimedia service rather than a signaling stream of the multimedia service is emphasized), "out-of-band retransmission" described in the following embodiments is to perform application layer retransmission through another transport layer connection, and perform re-sequencing at the application layer. In this way, the retransmission is transferred out of band, which eliminates influence caused by "retransmitting to a crash", such as delay accumulation, blocking of a subsequent part of media stream of a multimedia service, and a service interrupt. However, for a signaling stream of the multimedia service, reliable and orderly transmission needs to be ensured, and a manner of in-band retransmission is still maintained.

Figure 19:
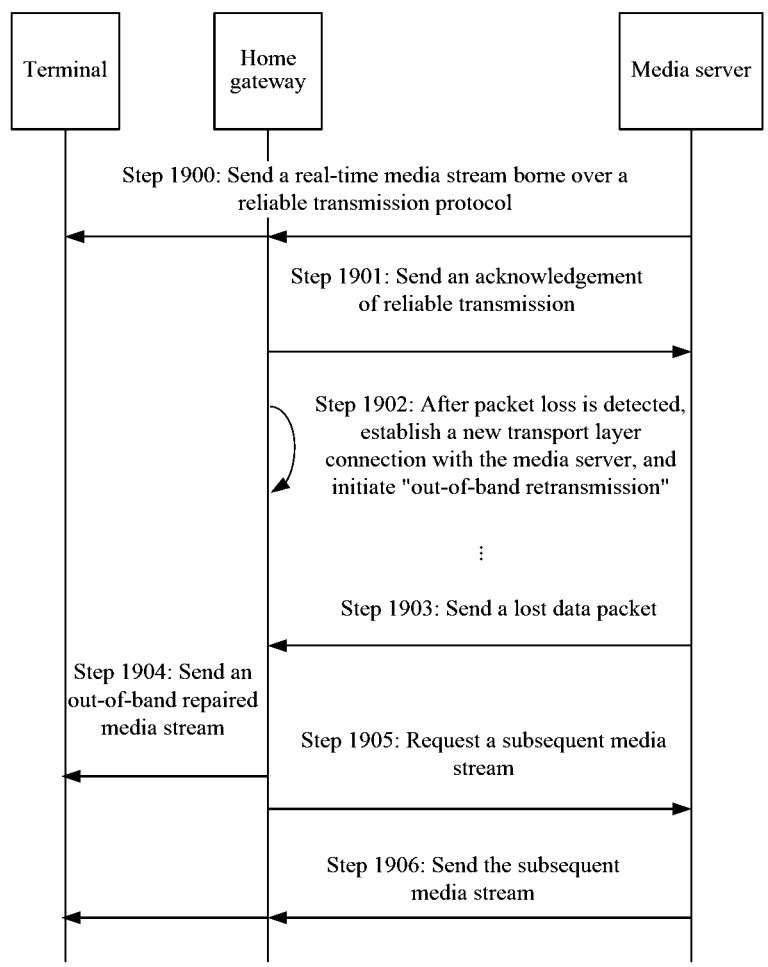
FIG. 19 is a schematic flow chart of out-of-band retransmission according to an embodiment of the present invention.

FIG. 19 is a schematic flow chart of out-of-band retransmission according to an embodiment of the present invention. As shown in FIG. 19, a procedure that a receiving end of a real-time media stream initiates the out-of-band retransmission is described with a home gateway as an example, where the home gateway serves as a receiving agent of the real-time media stream. The method includes:

Step 1900: A media server sends, through the home gateway, a terminal a real-time media stream borne over a reliable transmission protocol.

Step 1901: The home gateway returns an acknowledgement of reliable transmission to the media server.

Step 1902: The home gateway detects packet loss at a transport layer, establishes a new transport layer connection with the media server, and initiates "out-of-band retransmission".

Step 1903: The media server sends a lost data packet to the home gateway through the newly established transport layer connection, and performs an out-of-band repair.

Step 1904: The home gateway sends an out-of-band repairing media stream to the terminal.

Step 1905: The home gateway requests a subsequent part of media stream of a multimedia service from the media server through an original transport layer connection.

Step 1906: The media server sends, through the home gateway, the terminal the subsequent part of media stream of the multimedia service.

The out-of-band retransmission may be initiated by the receiving end of the real-time media stream, and then the subsequent part of media stream is requested. The out-of-band retransmission may also be initiated by a sending end of the real-time media stream. There are two methods herein: One is to notify, through signaling, a receiving end of a real-time media stream of initiating establishment of a new transport layer connection for transmitting a repairing stream; and the other is that a sending end initiates the establishment of the new transport layer connection for transmitting the repairing stream, and then continues to send an original subsequent part of media stream of a multimedia service.

Figure 20:
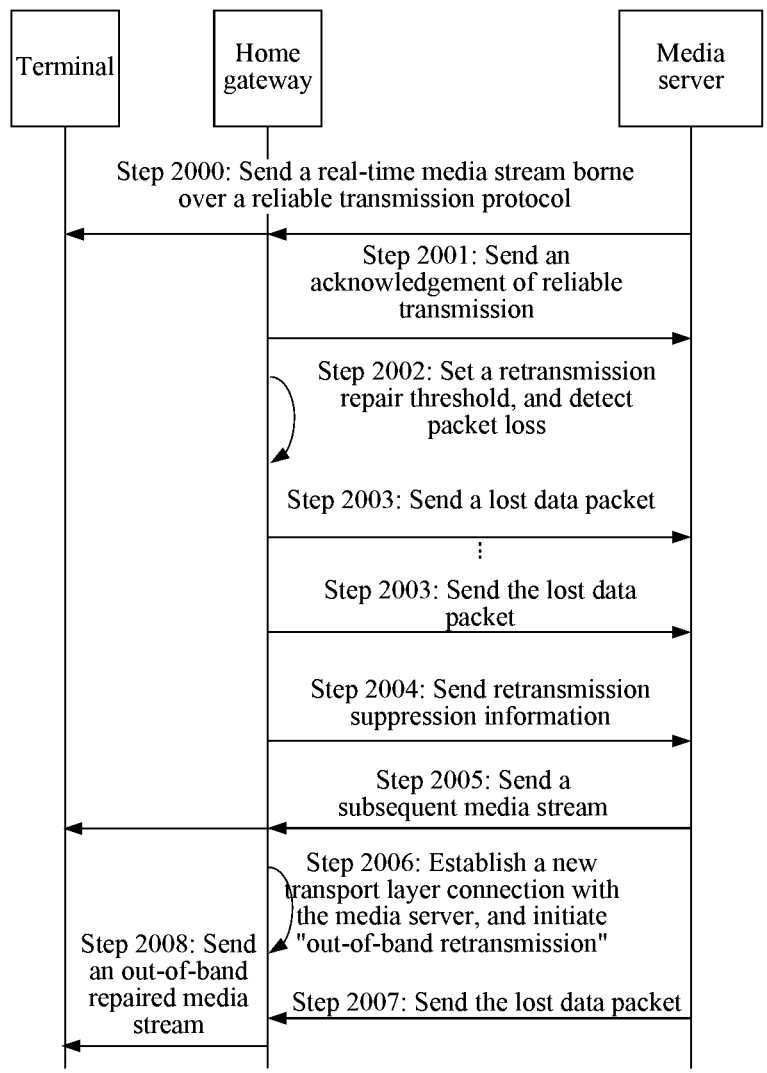
FIG. 20 is a schematic flow chart of a combined embodiment of "packet loss tolerance" and "out-of-band retransmission" according to the present invention.

FIG. 20 is a schematic flow chart of a combined embodiment of "packet loss tolerance" and "out-of-band retransmission" according to the present invention. As shown in FIG. 20, the method includes:

Step 2000: A media server sends, through a home gateway, a terminal a real-time media stream borne over a reliable transmission protocol.

Step 2001: The home gateway returns an acknowledgement of reliable transmission to the media server.

Step 2002: After setting a retransmission repair threshold, the home gateway detects packet loss at a transport layer and initiates a retransmission operation.

Step 2003: The home gateway sends the media server a request for retransmitting a lost data packet.

Step 2004: The home gateway sends retransmission suppression information to the media server, if it is determined that a retransmission request operation exceeds the retransmission threshold.

Step 2005: The media server continues to send, through the home gateway, the terminal a subsequent part of media stream of a multimedia service.

Step 2006: The home gateway establishes a new transport layer connection with the media server and initiates the "out-of-band retransmission".

Step 2007: The media server sends a lost data packet to the home gateway through the newly established transport layer connection, and performs an out-of-band repair.

Step 2008: The home gateway sends an out-of-band repaired media stream of the multimedia service to the terminal.

This embodiment integrates the embodiments of the foregoing "packet loss tolerance" and the "out-of-band retransmission". That is, essentially, finite times of "in-band retransmission" are firstly attempted after the packet loss at the transport layer is detected, and if an in-band retransmission repair fails, the retransmission suppression information is sent to a peer end, the peer end is requested to continue to send the subsequent part of media stream of the multimedia service, and meanwhile an out-of-band retransmission repair is initiated.

The method of "out-of-band retransmission" provided by the foregoing embodiment is out-of-band application layer retransmission. For a real-time media stream borne over a reliable transmission protocol (note that here a media stream of a multimedia service rather than a signaling stream of the multimedia service is emphasized), this embodiment further provides a method of out-of-band transport layer retransmission in the "out-of-band retransmission". That is, transport layer retransmission is performed through another transport layer connection. Specifically, after a receiving end or a sending end detects packet loss at a transport layer, a new transport layer connection is established between the receiving end and the sending end. The receiving end requests, according to a sequence number or a timestamp of a lost data packet, the sending end to perform data packet retransmission. The sending end retransmits, through a newly established transport layer connection, the lost data packet to the receiving end according to the sequence number or the timestamp. For the sending end, the sending end establishes the new transport layer connection with the receiving end, and sends, through the new transport layer connection, the receiving end a data packet corresponding to the sequence number or timestamp requested by the receiving end. For the receiving end, the receiving end establishes the new transport layer connection with the sending end, and receives, through the new transport layer connection, the data packet that corresponds to the requested sequence number or timestamp and is sent by the sending end. A TCP timestamp may be set through an API, and a setting rule is controlled by an application layer. For a multimedia service, the TCP timestamp may be filled with a clock used by encoding or filled with a periodical local time.

In each embodiment of the present invention, the influence of "in-band retransmission" is limited within an acceptable range through the "retransmission suppression" and/or the "out-of-band retransmission", so that a problem that by retransmission delay accumulation and retransmission blocking a subsequent part of media stream cause decoding buffer underflow of a terminal may be solved, a problem that the retransmission delay accumulation and the retransmission blocking the subsequent part of media stream cause buffer transmission load aging of an edge server may be solved, and a problem of a service interrupt caused by disconnection after a retransmission repair fails may be solved, thereby improving picture quality.

Figure 21:
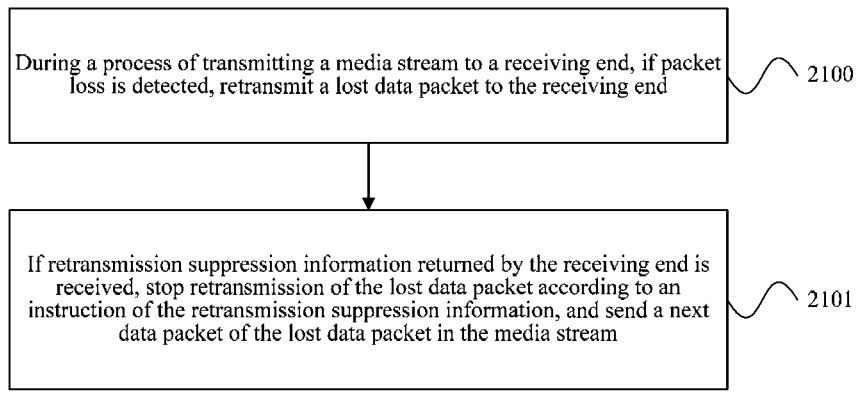
FIG. 21 is a flow chart of an eleventh embodiment of a method for sending a media stream according to the present invention.

Each of the foregoing embodiments provides a method where a sending end or a receiving end simultaneously detects packet loss and sends retransmission suppression information. An embodiment of the present invention provides a method where a sending end detects packet loss and a receiving end performs retransmission suppression. FIG. 21 is a flow chart of an eleventh embodiment of a method for sending a media stream according to the present invention. As shown in FIG. 21, the method includes:

Step 2100: During a process of sending a media stream to a receiving end, if packet loss is detected, retransmit a lost data packet to the receiving end.

Step 2101: If retransmission suppression information returned by the receiving end is received, stop retransmission of the lost data packet according to an instruction of the retransmission suppression information, and send a next data packet of the lost data packet in the media stream.

Specifically, during a process that a sending end sends a real-time media stream to the receiving end, if that the packet loss occurs at a transport layer is known in a manner such as receiving no success acknowledgement or receiving a request that requests lost packet retransmission and is returned by the receiving end, the sending end retransmits the lost data packet to the receiving end. If for some reason, the receiving end still does not successfully receive the data packet retransmitted by the sending end, in order to avoid a defect of "repairing until a crash", if the receiving end does not successfully receive the lost packet within a range limited by a retransmission threshold, the receiving end sends, when the retransmission threshold is reached, retransmission suppression information to the sending end. The retransmission suppression information is used to notify the sending end of stopping the retransmission of the lost data packet according to a preset "packet loss tolerance" repair mechanism, and request the sending end to send the next data packet of the lost data packet in the media stream of the multimedia service. After receiving the retransmission suppression information, the sending end continues, according to the instruction of the retransmission suppression information, to transmit a subsequent part of media stream of the multimedia service according to a sequence number, which ensures uninterrupted real-time transmission of the media stream of the multimedia service, and improves the integrity and smoothness of picture display.

Figure 22:
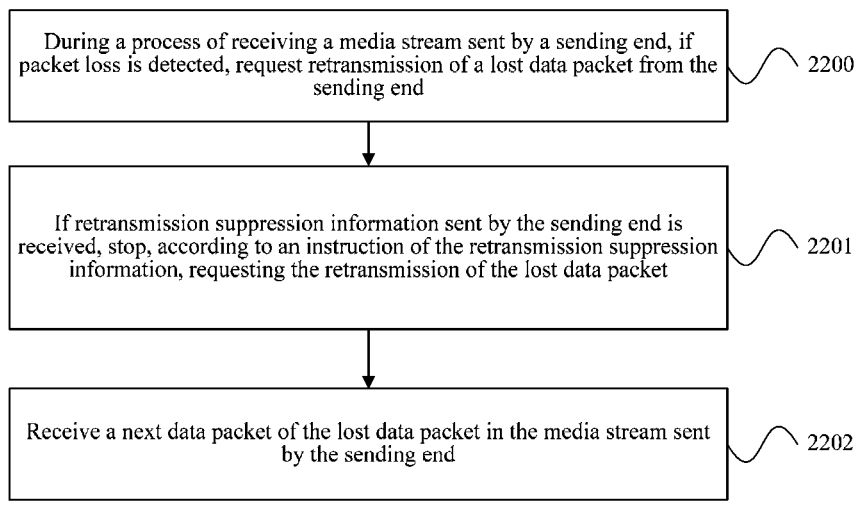
FIG. 22 is a flow chart of a twelfth embodiment of a method for receiving a media stream according to the present invention.

An embodiment of the present invention also provides a processing method where a receiving end detects packet loss and a sending end performs retransmission suppression. FIG. 22 is a flow chart of a twelfth embodiment of a method for receiving a media stream according to the present invention. As shown in FIG. 22, the method includes:

Step 2200: During a process of receiving a media stream sent by a sending end, if packet loss is detected, request retransmission of a lost data packet from the sending end.

Step 2201: If retransmission suppression information sent by the sending end is received, stop, according to an instruction of the retransmission suppression information, requesting the retransmission of the lost data packet.

Step 2202: Receive a next data packet of the lost data packet in the media stream sent by the sending end.

Specifically, during a process of receiving a real-time media stream sent by the sending end, when the receiving end detects, according to a sequence number of a data packet, that the packet loss occurs during a process that the sending end sends a media stream of a multimedia service, the receiving end requests the retransmission of the lost data packet from the sending end. If within a set retransmission threshold, the retransmitted data packet is still not successfully received by the receiving end though the sending end performs a retransmission operation several times on the lost data packet, and when the retransmission threshold is reached, the sending end sends retransmission suppression information to the receiving end. The retransmission suppression information is used to instruct the receiving end to stop requesting the retransmission of the lost data packet. After receiving the retransmission suppression information, the receiving end stops, according to the instruction of the retransmission suppression information, requesting the retransmission of the lost data packet. The sending end subsequently continues to transmit a subsequent part of media stream of the multimedia service according to a preset repair mechanism, and immediately the receiving end receives a next data packet of the lost data packet in the media stream that is of the multimedia service and is sent by the sending end, so as to ensure uninterrupted real-time transmission of the media stream of the multimedia service, and improve the integrity and smoothness of picture display.

In a subsequent operation of the method provided by each of the foregoing embodiments, a previously described repair mechanism of "out-of-band retransmission" is also applicable. Reference is made to the foregoing content for the details of the specific processing procedure, which is not described in detail herein again. A person having ordinary skill in the art can understand that all or part of the steps of the foregoing method embodiments may be implemented by a program instructing relevant hardware. The program may be stored in a computer readable storage medium. When the program is run, the steps of the foregoing method embodiments are performed. The storage medium may be any medium that is capable of storing program codes, such as a ROM, a RAM, a magnetic disk or an optical disk.

Figure 23:
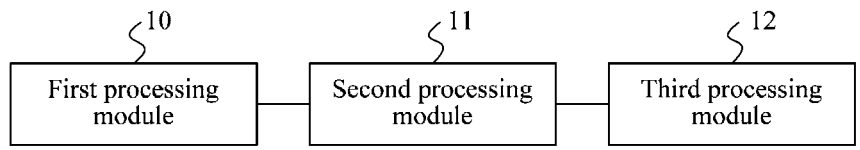
FIG. 23 is a schematic structural diagram of an embodiment of an apparatus for sending a media stream according to the present invention.

FIG. 23 is a schematic structural diagram of an embodiment of an apparatus for sending a media stream according to the present invention. As shown in FIG. 23, the apparatus for sending a media stream includes a first processing module 10, a second processing module 11 and a third processing module 12. The first processing module 10 is configured to, during a process of sending a media stream to a receiving end, if packet loss is detected, retransmit a lost data packet to a receiving end. The second processing module 11 is configured to send retransmission suppression information to the receiving end, for instructing the receiving end to stop requesting retransmission of the lost data packet, if the lost data packet is not successfully received by the receiving end within a set retransmission threshold. The third processing module 12 is configured to send the receiving end a next data packet of the lost data packet in the media stream.

Specifically, the apparatus for sending the media stream establishes a transport layer connection (for example, a TCP or SCTP connection) with an apparatus for receiving the media stream, and then performs real-time transmission of data. After the first processing module 10 in the apparatus for sending a media stream detects the packet loss (see the foregoing method introduction for the specific procedure of the detection), the lost data packet may be retransmitted to the apparatus for receiving a media stream.

The first processing module 10 retransmits the lost data packet. In order to avoid the occurrence of an existing defect of "repairing until a crash", a repair mechanism of "packet loss tolerance" is adopted in the embodiment of the present invention. When the retransmission threshold is reached, the second processing module 11 sends retransmission suppression information to the apparatus for receiving a media stream. The retransmission suppression information is used to instruct the apparatus for receiving a media stream to stop requesting the retransmission of the lost data packet, that is, to notify the apparatus for receiving a media stream of stopping, according to the preset repair mechanism of "packet loss tolerance", sending the retransmission request one more, and therefore, the apparatus for sending a media stream continues to send a subsequent part of media stream according to the preset repair mechanism. After the second processing module 11 sends the retransmission suppression information to the apparatus for receiving a media stream, the third processing model 12 obtains the next data packet of the lost data packet in the media stream according to a sequence number of the data packet, and directly sends the obtained packet to the apparatus for receiving a media stream.

In this embodiment, the second processing module 11 is also configured to, when blocking of a real-time sending queue is detected at an application layer of a sending end, and before the retransmission threshold is reached, send the retransmission suppression information to the apparatus for receiving a media stream, if an instruction for triggering retransmission suppression at the application layer is received.

Figure 24:
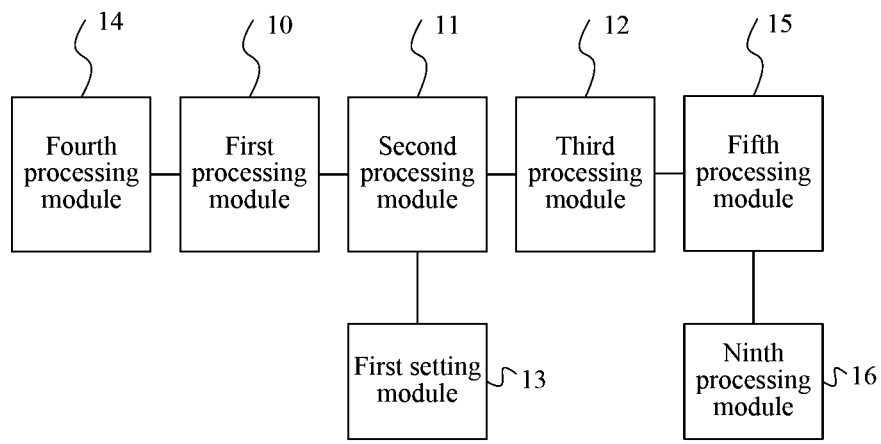
FIG. 24 is a schematic structural diagram of another embodiment of an apparatus for sending a media stream according to the present invention.

FIG. 24 is a schematic structural diagram of another embodiment of an apparatus for sending a media stream according to the present invention. As shown in FIG. 24, the apparatus for sending a media stream includes a first processing module 10, a second processing module 11 and a third processing module 12, and further includes a first setting module 13, configured to set a retransmission threshold before packet loss is detected, or after the packet loss is detected and before a lost data packet is retransmitted to an apparatus for receiving a media stream. The retransmission threshold includes a threshold of retransmission times and/or an accumulated delay threshold.

Further, the apparatus for sending a media stream may further include a fourth processing module 14, configured to, during a process of sending a media stream to the apparatus for receiving a media stream, add, to a transport layer load of each data packet in the media stream, a load identifier for uniquely identifying a data packet. In order to implement an application layer repair mechanism of "out-of-band retransmission", the apparatus for sending a media stream may further include a fifth processing module 15, configured to establish a new transport layer connection with the apparatus for receiving a media stream, and send, through the new transport layer connection, the apparatus for receiving a media stream a data packet corresponding to a load identifier requested by the apparatus for receiving a media stream.

The apparatus for sending a media stream provided by the embodiment of the present invention may further include a ninth processing module 16, so as to implement the transport layer repair mechanism of "out-of-band retransmission". Specifically, the apparatus for sending a media stream establishes, through the ninth processing module 16 in it, a new transport layer connection with a receiving end, and sends, through the new transport layer connection, the receiving end a data packet corresponding to a sequence number or timestamp requested by the receiving end.

For sending processing of the data packet by the apparatus for sending a media stream provided by the embodiment of the present invention, reference may be made to the method provided by the foregoing embodiment of the method for sending a media stream, and details are not described herein again.

In the apparatus for sending a media stream provided by the embodiment of the present invention, during a transmission process of media content, if the packet loss occurs, and if retransmission still does not succeed after the retransmission has been attempted for finite times, a retransmission operation on the lost packet is abandoned through notification of the retransmission suppression information, and transmission of a subsequent part of media stream is continued, which ensures uninterrupted transmission of the media stream, and avoids phenomena of a severe screen mess of a picture caused by congestion at an application layer, a picture jitter or pause caused by program buffer underflow, and even a program interrupt caused by disconnection of the network connection, thereby improving picture quality.

Figure 25:
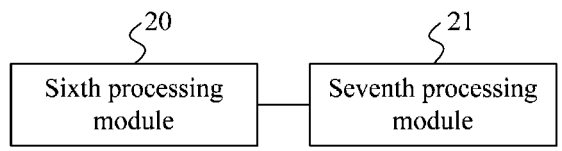
FIG. 25 is a schematic structural diagram of an embodiment of an apparatus for receiving a media stream according to the present invention.

FIG. 25 is a schematic structural diagram of an embodiment of an apparatus for receiving a media stream according to the present invention. As shown in FIG. 25, the apparatus for receiving a media stream includes a sixth processing module 20 and a seventh processing module 21. The sixth processing module 20 is configured to, during a process of receiving a media stream sent by an apparatus for sending a media stream, if packet loss is detected, request retransmission of a lost data packet from the apparatus for sending a media stream. The seventh processing module 21 is configured to, if the lost data packet is not successfully received within a set retransmission threshold, send retransmission suppression information to the apparatus for sending a media stream, for instructing the apparatus for sending a media stream to stop retransmission of the lost data packet and send a next data packet of the lost data packet in the media stream.

Specifically, the apparatus for sending a media stream establishes a transport layer connection (for example, a TCP or SCTP connection) with the apparatus for receiving a media stream, and then performs real-time transmission of data. The apparatus for sending a media stream may perform sending in order according to a sequence number of a data packet. When the sixth processing module 20 of the apparatus for receiving a media stream detects, according to the sequence number of the data packet, that the packet loss occurs during a process that the apparatus for sending a media stream sends a media stream, the retransmission of the lost data packet is requested from the apparatus for sending a media stream. After the sixth processing module 20 sends a retransmission request to the apparatus for sending a media stream, the apparatus for sending a media stream adopts a repair mechanism of "packet loss tolerance" to retransmit the lost data packet requested to be retransmitted. If a retransmission repair fails within a set retransmission threshold, and when the retransmission threshold is reached, the seventh processing module 21 sends retransmission suppression information to the apparatus for sending a media stream. After receiving the retransmission suppression information, the apparatus for sending a media stream may continue, according to arrangement, to transmit a subsequent part of media stream according to the sequence number, which ensures uninterrupted real-time transmission of the media stream.

Figure 26:
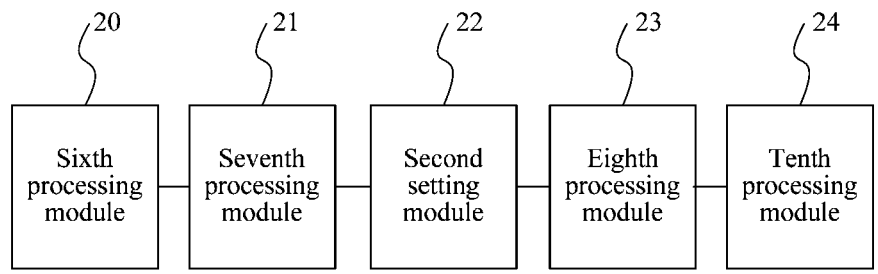
FIG. 26 is a schematic structural diagram of another embodiment of an apparatus for receiving a media stream according to the present invention.

FIG. 26 is a schematic structural diagram of another embodiment of an apparatus for receiving a media stream according to the present invention. As shown in FIG. 26, the apparatus for receiving a media stream includes a sixth processing module 20 and a seventh processing model 21, and further includes a second setting module 22, configured to set a retransmission threshold before packet loss is detected, or after the packet loss is detected and before retransmission of a lost data packet is requested from an apparatus for sending a media stream. The retransmission threshold includes a threshold of retransmission times and/or an accumulated delay threshold.

Further, an eighth processing module 23 is further included, and is configured to send a request, for establishing a new transport layer connection, to the apparatus for sending a media stream, where a load identifier corresponding to the lost data packet is carried, and establish a new transport layer connection with the apparatus for sending a media stream, and receive, through the new transport layer connection, a data packet that corresponds to the load identifier and is sent by the apparatus for sending a media stream. The apparatus for receiving a media stream implements "out-of-band retransmission" through the eighth processing module 23.

Furthermore, in the apparatus for receiving a media stream provided by this embodiment, the seventh processing module 21 may also be configured to counterfeit an acknowledgement message for indicating that the lost data packet is already successfully received, and send the counterfeit acknowledgement message as retransmission suppression information to the apparatus for sending a media stream.

The apparatus for receiving a media stream provided by the embodiment of the present invention may further include a tenth processing module 24, to implement a transport layer repair mechanism of "out-of-band retransmission". Specifically, the apparatus for receiving a media stream establishes, through the tenth processing module 24 in it, a new transport layer connection with a sending end, and receives, through the new transport layer connection, a data packet that corresponds to a requested sequence number or timestamp and is sent the sending end.

For sending processing of the data packet by the apparatus for receiving a media stream provided by the embodiment of the present invention, reference may be made to a method provided by the foregoing embodiment of the method for receiving a media stream, and details are not described herein again.

In the apparatus for receiving a media stream provided by the embodiment of the present invention, during a transmission process of media content, if the packet loss occurs, and if retransmission still does not succeed after the retransmission has been attempted for finite times, a retransmission operation on the lost packet is abandoned through notification of the retransmission suppression information, and transmission of a subsequent part of media stream is continued, which ensures uninterrupted transmission of the media stream, and avoids phenomena of a severe screen mess of a picture caused by congestion at an application layer, a picture jitter or pause caused by program buffer underflow, and even a program interrupt caused by disconnection of the network connection, thereby improving picture quality.

The apparatus provided by each of the foregoing embodiments may not only be applied to a server, a computer, a cell phone terminal, an STB terminal and so on, but may also be applied to a real-time media streaming functional module which is embedded in a network device and is provided based on a reliable transmission protocol, such as a home gateway, an access device or a router.

Figure 27:
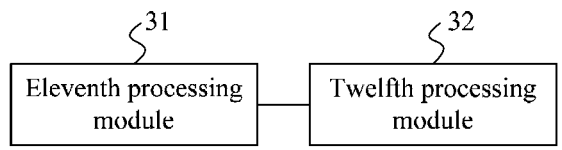
FIG. 27 is a schematic structural diagram of an embodiment of another apparatus for sending a media stream according to the present invention.

FIG. 27 is a schematic structural diagram of an embodiment of another apparatus for sending a media stream according to the present invention. As shown in FIG. 27, the apparatus for sending a media stream includes an eleventh processing module 31 and a twelfth processing module 32. The eleventh processing module 31 is configured to, during a process of sending a media stream to the receiving end, if packet loss is detected, retransmit a lost data packet to a receiving end. If retransmission suppression information returned by the receiving end is received, the twelfth processing module 32 stops retransmission of the lost data packet according to an instruction of the retransmission suppression information, and sends a next data packet of the lost data packet in the media stream.

Specifically, during the process of sending the real-time media stream to an apparatus for receiving a media stream, if that the packet loss occurs at a transport layer is known in a manner such as receiving no success acknowledgement or receiving a request that requests lost packet retransmission and is returned by the apparatus for receiving a media stream, the eleventh processing module 31 retransmits the lost data packet to the apparatus for receiving a media stream. If for some reason, the apparatus for receiving a media stream still does not successfully receive the data packet retransmitted by the apparatus for sending a media stream, in order to avoid a defect of "repairing until a crash", if the apparatus for receiving a media stream does not successfully receive the lost packet within a range limited by a retransmission threshold, the apparatus for receiving a media stream sends, when the retransmission threshold is reached, retransmission suppression information to the apparatus for sending a media stream. The retransmission suppression information is used to notify the apparatus for sending a media stream of stopping retransmission of the lost data packet according to a preset repair mechanism of "packet loss tolerance", and request the apparatus for sending a media stream to send the next data packet of the lost data packet in the media stream. After receiving the retransmission suppression information, the twelfth processing module 32 continues, according to an instruction of the retransmission suppression information, to transmit the subsequent part of media stream according to the sequence number, which ensures uninterrupted real-time transmission of the media stream, and improves the integrity and smoothness of picture display.

Figure 28:
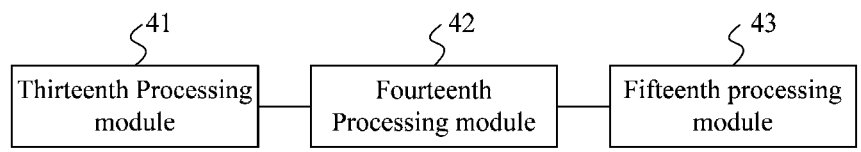
FIG. 28 is a schematic structural diagram of an embodiment of another apparatus for receiving a media stream according to the present invention.

FIG. 28 is a schematic structural diagram of an embodiment of another apparatus for receiving a media stream according to the present invention. As shown in FIG. 28, the apparatus for receiving a media stream includes a thirteenth processing module 41, a fourteenth processing module 42 and a fifteenth processing module 43. During a process of receiving a media stream sent by a sending end, if packet loss is detected, the thirteenth processing module 41 requests retransmission of a lost data packet from the sending end. If retransmission suppression information sent by the sending end is received, the fourteenth processing module 42 stops requesting the retransmission of the lost data packet according to an instruction of the retransmission suppression information. The fifteenth processing module 43 receives a next data packet of the lost data packet in the media stream sent by the sending end.

Specifically, during a process of receiving a real-time media stream sent by an apparatus for sending a media stream, when the apparatus for receiving a media stream detects, according to a sequence number of a data packet, that the packet loss occurs during a process that the apparatus for sending a media stream sends the media stream, the thirteenth processing module 41 requests the retransmission of the lost data packet from the apparatus for sending a media stream. If within a set retransmission threshold, the retransmitted data packet is still not successfully received by the apparatus for receiving a media stream though the apparatus for sending a media stream performs a retransmission operation several times on the lost data packet, and when the retransmission threshold is reached, the apparatus for sending a media stream sends retransmission suppression information to the apparatus for receiving a media stream. The retransmission suppression information is used to instruct the apparatus for receiving a media stream to stop requesting the retransmission of the lost data packet. After receiving the retransmission suppression information, the fourteenth processing module 42 stops, according to an instruction of the retransmission suppression information, requesting the retransmission of the lost data packet. The apparatus for sending a media stream subsequently continues to transmit a subsequent part of media stream according to a preset repair mechanism. The fifteenth processing module 43 immediately receives a next data packet of the lost data packet in the media stream sent by the apparatus for sending a media stream, so as to ensure uninterrupted real-time transmission of the media stream, and improve the integrity and smoothness of picture display.

The processing of a retransmission repair mechanism of the apparatus provided by each of the foregoing embodiments may adopt a procedure provided by the foregoing method embodiment, and is surely applicable to the repair mechanism of "out-of-band retransmission" described above. For the specific processing procedure, reference is made to the foregoing content, and details are not described herein again.

Figure 29:
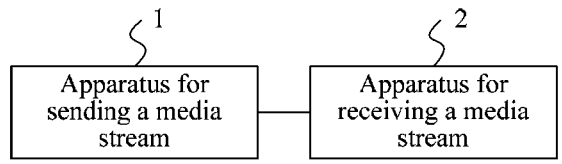
FIG. 29 is a schematic structural diagram of an embodiment of a network system according to the present invention.

FIG. 29 is a schematic structural diagram of an embodiment of a network system according to the present invention. As shown in FIG. 29, the system includes an apparatus for sending a media stream 1 and an apparatus for receiving a media stream 2. The apparatus for sending a media stream 1 and the apparatus for receiving a media stream 2 may perform transmission of a transport layer media stream through the foregoing retransmission repair mechanisms of "packet loss tolerance" and "out-of-band retransmission", thereby ensuring picture quality. The apparatuses provided by the embodiments of an apparatus for sending a media stream that are shown in FIG. 23 and FIG. 24 may be adopted as the apparatus for sending a media stream 1. The apparatus provided by the embodiment of an apparatus for receiving a media stream shown in FIG. 28 may be adopted as the apparatus for receiving a media stream 2. Their specific structures and functions are not described in detail herein again.

Figure 30:
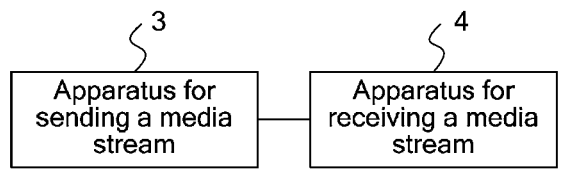
FIG. 30 is a schematic structural diagram of an embodiment of another network system according to the present invention.

FIG. 30 is a schematic structural diagram of an embodiment of another network system according to the present invention. As shown in FIG. 30, the system includes an apparatus for sending a media stream 3 and an apparatus for receiving a media stream 4. The apparatus for sending a media stream 3 and the apparatus for receiving a media stream 4 may perform transmission of a transport layer media stream through the foregoing retransmission repair mechanisms of "packet loss tolerance" and "out-of-band retransmission", thereby ensuring picture quality. The apparatus provided by the embodiment of an apparatus for sending a media stream shown in FIG. 27 may be adopted as the apparatus for sending a media stream 3. The apparatuses provided by the embodiments of an apparatus for receiving a media stream that are shown in FIG. 25 and FIG. 26 may be adopted as the apparatus for receiving a media stream 4. Their specific structures and functions are not described in detail herein again.

Finally, it should be noted that the foregoing embodiments are merely used for describing, rather than limiting the technical solutions of the present invention. Although the present invention is described in detail with reference to the foregoing embodiments, it should be understood by a person having ordinary skill in the art that, they still can make modifications to the technical solution recorded in each of the foregoing embodiments, or equivalent replacements to part of technical features in it, and such modifications or replacements do not cause the essence of corresponding technical solutions to depart from the spirit and scope of the technical solution of each of the embodiments of the present invention.

What is claimed is:

1. A method for receiving a media stream, comprising:
   detecting, during a process of receiving the media stream sent by a sending end, a data packet loss;
   requesting, in response to the detecting, retransmission of a lost data packet from the sending end; and
   sending, if the lost data packet is not successfully received within a set retransmission threshold, a counterfeit acknowledgement message to the sending end,
   wherein the counterfeit acknowledgement message implements implicit retransmission suppression by falsely providing an indication to the sending end that the lost data packet is already successfully received so that the sending end stops retransmitting the lost data packet and sends a next data packet after the lost data packet in the media stream.

2. The method for receiving a media stream according to claim 1, wherein the retransmission threshold comprises one of the group consisting of:
   a threshold of retransmission times;
   an accumulated delay threshold; and
   the threshold of the retransmission times and the accumulated delay threshold.

3. The method for receiving a media stream according to claim 1, wherein a transport layer load of each data packet in the media stream carries a load identifier for uniquely identifying a data packet.

4. The method for receiving a media stream according to claim 3, further comprising:
   sending the sending end a request for establishing a new transport layer connection, wherein a load identifier corresponding to the lost data packet is carried; and
   establishing a new transport layer connection with the sending end, and receiving, through the new transport layer connection, a data packet corresponding to the load identifier and is sent by the sending end.

5. An apparatus for receiving a media stream, comprising:
   a first processing module, configured to:
      detect, during a process of receiving the media stream sent by a sending end, a data packet loss, and
      request, in response to detecting the data packet loss,
   retransmission of a lost data packet from the sending end; and
   a second processing module, configured to send, if the lost data packet is not successfully received within a set retransmission threshold, a counterfeit acknowledgement message to the sending end,
   wherein the counterfeit acknowledgement message implements implicit retransmission suppression by falsely providing an indication to the sending end that the lost data packet is successfully received so that the sending end stops retransmitting the lost data packet and sends a next data packet after the lost data packet in the media stream.

6. The apparatus for receiving a media stream according to claim 5, further comprising:
   a setting module, configured to implement one of the group consisting of:
   (a) setting the retransmission threshold before the packet loss is detected, and
   (b) setting the retransmission threshold after the packet loss is detected and before the requesting the retransmission of the lost data packet from the sending end;
   wherein the retransmission threshold comprises one of the group consisting of:
   a threshold of retransmission times;
   an accumulated delay threshold; and
   the threshold of the retransmission times and the accumulated delay threshold.

7. The apparatus for receiving a media stream according to claim 5, further comprising a third processing module, configured to:
   send the sending end a request for establishing a new transport layer connection, wherein a load identifier corresponding to the lost data packet is carried;
   establish the new transport layer connection with the sending end; and
   receive, through the new transport layer connection, the lost data packet corresponding to the load identifier and sent by the sending end.

* * * * *